US008080335B2

United States Patent
Kawakami et al.

(10) Patent No.: US 8,080,335 B2
(45) Date of Patent: Dec. 20, 2011

(54) POWDER MATERIAL, ELECTRODE STRUCTURE USING THE POWDER MATERIAL, AND ENERGY STORAGE DEVICE HAVING THE ELECTRODE STRUCTURE

(75) Inventors: Soichiro Kawakami, Machida (JP); Hidetoshi Tsuzuki, Kawasaki (JP); Toshiaki Aiba, Fujisawa (JP); Rie Ueno, Hadano (JP); Masatoshi Watanabe, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 564 days.

(21) Appl. No.: 11/808,435

(22) Filed: Jun. 11, 2007

(65) Prior Publication Data

US 2008/0003503 A1    Jan. 3, 2008

(30) Foreign Application Priority Data

Jun. 9, 2006    (JP) .................... 2006-161526

(51) Int. Cl.
*H01M 4/13*    (2010.01)
(52) U.S. Cl. .................... 429/218.1; 252/182.1
(58) Field of Classification Search .............. None
See application file for complete search history.

(56) References Cited

U.S. PATENT DOCUMENTS

| | | | |
|---|---|---|---|
| 4,615,960 A | 10/1986 | Yata | 429/194 |
| 5,491,037 A | 2/1996 | Kawakami | 429/49 |
| 5,538,814 A * | 7/1996 | Kamauchi et al. | 429/303 |
| 5,641,591 A | 6/1997 | Kawakami et al. | 429/218 |
| 5,658,689 A | 8/1997 | Kawakami et al. | 429/194 |
| 5,698,339 A | 12/1997 | Kawakami et al. | 429/212 |
| 5,702,845 A | 12/1997 | Kawakami et al. | 429/224 |
| 5,728,482 A | 3/1998 | Kawakami et al. | 429/10 |
| 5,795,679 A | 8/1998 | Kawakami et al. | 429/218 |
| 5,800,939 A | 9/1998 | Mishina et al. | 429/57 |
| 5,824,434 A | 10/1998 | Kawakami et al. | 429/209 |
| 5,882,811 A | 3/1999 | Kawakami | 429/49 |
| 5,888,666 A | 3/1999 | Kawakami | 429/62 |
| 5,919,589 A | 7/1999 | Kawakami et al. | 429/231.8 |

(Continued)

FOREIGN PATENT DOCUMENTS

JP    60-170163    9/1985

(Continued)

OTHER PUBLICATIONS

Machine translation of JP 2003-500318.*

(Continued)

*Primary Examiner* — Cynthia Lee
(74) *Attorney, Agent, or Firm* — Fitzpatrick, Cella, Harper & Scinto

(57) ABSTRACT

A powder material which can electrochemically store and release lithium ions rapidly in a large amount is provided. In addition, an electrode structure for an energy storage device which can provide a high energy density and a high power density and has a long life, and an energy storage device using the electrode structure are provided. In a powder material which can electrochemically store and release lithium ions, the surface of particles of one of silicon metal and tin metal and an alloy of any thereof is coated by an oxide including a transition metal element selected from the group consisting of W, Ti, Mo, Nb, and V as a main component. The electrode structure includes the powder material. The battery device includes a negative electrode having the electrode structure, a lithium ion conductor, and a positive electrode, and utilizes an oxidation reaction of lithium and a reduction reaction of lithium ion.

20 Claims, 13 Drawing Sheets

U.S. PATENT DOCUMENTS

| | | | |
|---|---|---|---|
| 5,998,063 A | 12/1999 | Kobayashi et al. | 429/218.1 |
| 6,051,340 A | 4/2000 | Kawakami et al. | 429/231.95 |
| 6,063,142 A | 5/2000 | Kawakami et al. | 29/623.5 |
| 6,165,642 A | 12/2000 | Kawakami et al. | 429/218.1 |
| 6,252,762 B1 | 6/2001 | Amatucci | 361/503 |
| 6,294,292 B1* | 9/2001 | Tsushima et al. | 429/231.8 |
| 6,301,093 B1 | 10/2001 | Noguchi et al. | 361/512 |
| 6,329,096 B2 | 12/2001 | Kawakami et al. | 429/49 |
| 6,372,387 B1 | 4/2002 | Kawakami et al. | 429/303 |
| 6,377,030 B1 | 4/2002 | Asao et al. | 320/161 |
| 6,432,585 B1 | 8/2002 | Kawakami et al. | 429/233 |
| 6,475,664 B1 | 11/2002 | Kawakami et al. | 429/137 |
| 6,517,974 B1 | 2/2003 | Kobayashi et al. | 429/231.95 |
| 6,558,847 B1 | 5/2003 | Kawakami et al. | 429/231.95 |
| 6,558,848 B1 | 5/2003 | Kobayashi et al. | 429/241 |
| 6,569,568 B2 | 5/2003 | Kobayashi et al. | 429/221 |
| 6,596,432 B2 | 7/2003 | Kawakami et al. | 429/60 |
| 6,638,322 B1 | 10/2003 | Kawakami et al. | 29/623.1 |
| 6,649,304 B2 | 11/2003 | Tani et al. | 429/223 |
| 6,692,665 B2* | 2/2004 | Shima et al. | 252/518.1 |
| 6,721,168 B2 | 4/2004 | Takeuchi et al. | 361/502 |
| 6,730,434 B1 | 5/2004 | Kawakami et al. | 429/218.1 |
| 6,756,154 B2* | 6/2004 | Maeda et al. | 429/231.3 |
| 6,835,332 B2 | 12/2004 | Yamamoto et al. | 252/519.1 |
| 6,902,845 B2 | 6/2005 | Tani et al. | 429/218.2 |
| 6,924,059 B1 | 8/2005 | Kawakami et al. | 429/162 |
| 6,932,955 B2 | 8/2005 | Yamamoto et al. | 423/518 |
| 6,949,312 B1 | 9/2005 | Kawakami et al. | 429/218.1 |
| 7,060,117 B2 | 6/2006 | Ogura et al. | 29/623.2 |
| 7,141,187 B2 | 11/2006 | Kosuzu et al. | 252/521.3 |
| 7,183,018 B2 | 2/2007 | Kawakami et al. | 429/218.1 |
| 7,190,171 B2 | 3/2007 | Kawakami et al. | 324/430 |
| 7,316,792 B2 | 1/2008 | Kosuzu et al. | 252/521.3 |
| 2003/0211396 A1 | 11/2003 | Kobayashi et al. | 429/231.95 |
| 2005/0003273 A1 | 1/2005 | Hagiwara et al. | 429/231.95 |
| 2005/0019668 A1 | 1/2005 | Yamamoto et al. | 429/317 |
| 2005/0079423 A1* | 4/2005 | Matsubara et al. | 429/231.95 |
| 2006/0006837 A1 | 1/2006 | Ogura et al. | 320/112 |
| 2006/0040182 A1 | 2/2006 | Kawakami et al. | 429/218.1 |
| 2006/0127773 A1 | 6/2006 | Kawakami et al. | 429/245 |
| 2006/0147797 A1* | 7/2006 | Wu et al. | 429/218.1 |
| 2006/0154071 A1 | 7/2006 | Homma et al. | 428/403 |
| 2007/0031730 A1 | 2/2007 | Kawakami et al. | 429/218.1 |
| 2007/0120554 A1 | 5/2007 | Kawakami et al. | 324/133 |
| 2007/0122701 A1* | 5/2007 | Yamaguchi | 429/218.1 |
| 2007/0218356 A1 | 9/2007 | Kawamura et al. | 429/209 |

FOREIGN PATENT DOCUMENTS

| | | | |
|---|---|---|---|
| JP | 2-181365 | | 7/1990 |
| JP | 4-34870 | | 2/1992 |
| JP | 8-107048 | | 4/1996 |
| JP | 11-283627 | | 10/1999 |
| JP | 2000-268881 | | 9/2000 |
| JP | 2000-311681 | | 11/2000 |
| JP | 2000-340470 | | 12/2000 |
| JP | 2002-25867 | | 1/2002 |
| JP | 2003-500318 | * | 1/2003 |
| JP | 2003-109873 | | 4/2003 |
| JP | 2003-123740 | * | 4/2003 |
| JP | 2003-224037 | | 8/2003 |
| JP | 2004-79321 | | 3/2004 |
| JP | 2004-103669 | | 4/2004 |
| JP | 2004-178828 | | 6/2004 |
| JP | 2005-86113 | | 3/2005 |
| JP | 2005-108595 | | 4/2005 |
| WO | 00/17949 | | 3/2000 |

OTHER PUBLICATIONS

Ahn, JH, et. al, Tin-based composite materials as anode materials for li-ion batteries, Journal of Power Sources 119-121 (2003) 45-49.*

Machine translation of JP 2003-123740 retrieved from <http://www19.ipdl.inpit.go.jp/PA1/cgi-bin/PA1INDEX> on Jul. 28, 2011.*

Glenn G. Amatucci, et al., "An Asymmetric Hybrid Nonaqueous Energy Storage Cell," Journal of the Electrochemical Society, vol. 148, No. 8, 2001, pp. A930-A939.

* cited by examiner

Si-20%Li4Ti5O12

SECONDARY
ELECTRON IMAGE    1μm

SiKα1

TiKα1

OKα1

SiSnCuC-20%Li4Ti5O12

SECONDARY
ELECTRON IMAGE
0.5μm

SiKα1

TiKα1

OKα1

SnLα1

CuLα1

STEM-EDX MAPPING

POWDER MATERIAL, ELECTRODE STRUCTURE USING THE POWDER MATERIAL, AND ENERGY STORAGE DEVICE HAVING THE ELECTRODE STRUCTURE

BACKGROUND OF THE INVENTION

1. Field of the Invention

The present invention relates to a powder material of fine particles mainly including a metal such as silicon or tin that is alloyed with lithium by an electrochemical reaction, and a metal oxide or a half metal oxide; an electrode structure including the powder material; and an energy storage device including the electrode structure.

2. Description of the Related Art

Recently, the amount of $CO_2$ gas contained in the atmosphere has been increased, so that the possibility of the green house effect to give rise to global warming has been pointed out. Further, the air pollution due to substances including $CO_2$, $NO_x$, hydrocarbon and the like is causing a serious problem. Moreover, in the light of the increase of crude oil price, attention has been focused on a hybrid vehicle including an engine and an electric motor operated by an electric energy stored in an energy storage device and an electric vehicle from the viewpoint of environmental protection. Therefore, in order to improve the performance of the hybrid vehicle and electric vehicle and reduce the production cost thereof, there is a need for development of a capacitor or an energy storage device such as a secondary battery having both high power density and high energy density.

In addition, the function of portable devices such as a mobile phone, a notebook personal computer, a digital camcorder, a digital camera, a PDA (personal digital assistant) and the like has advanced year by year. As a power source for operation thereof, there is desired the development of a small, lightweight, high-capacity energy storage device such as a secondary battery that can be rapidly charged.

As a representative example of the energy storage device, there is included the so-called "lithium ion battery" of a rocking chair type in which a lithium intercalation compound which deintercalates lithium ions from between layers in a reaction at the time of charging is used as a positive electrode material and a carbon material represented by graphite which intercalates lithium ions between layers of six-membered ring network planes provided by carbon atoms is used as a negative electrode material. The lithium ion battery has a high battery voltage and a high energy density and is therefore in widespread use as a power source for various portable devices and is being considered as a power source for a hybrid vehicle.

However, since the negative electrode is composed of a carbon material, theoretically this "lithium ion battery" allows intercalation of only one sixth in maximum of a lithium atom per one carbon atom of the carbon material. Therefore, further increase in capacity is difficult and a new electrode material for attaining further increase in capacity is being desired. In addition, although the "lithium ion battery" has a high energy density and is expected as a power source for a hybrid vehicle and an electric vehicle, there is a problem that the internal resistance of the battery is too high to release a sufficient amount of electricity at the time of rapid discharge, that is, the power density is small. Therefore, development of an energy storage device with a high power density and a high energy density is desired.

In order to further increase the capacity of the lithium secondary battery including the "lithium ion battery", the present inventors has proposed a negative electrode for a lithium secondary battery including silicon and tin elements in U.S. Pat. Nos. 6,051,340, 5,795,679, 6,432,585, Japanese Patent Application Laid-Open No. H11-283627, U.S. Pat. Nos. 6,517,974, 6,569,568, Japanese Patent Application Laid-Open No. 2000-311681 and WO 00/17949.

In U.S. Pat. No. 6,051,340 a lithium secondary battery has been proposed which uses a negative electrode formed by providing, on a current collector of a metal material that is not alloyable with lithium, an electrode layer formed of a metal such as silicon and tin that is alloyable with lithium and a metal such as nickel and copper that is not alloyable with lithium.

In U.S. Pat. No. 5,795,679, a negative electrode has been proposed which is formed of powder of an alloy of an element such as nickel and copper and an element such as tin. In U.S. Pat. No. 6,432,585, a lithium secondary battery has been proposed which uses a negative electrode with an electrode material layer containing at least 35 wt. % of particles with an average particle diameter of 0.5 to 60 µm and including silicon, tin, and the like and having a porosity of 0.10 to 0.86 and a density of 1.00 to 6.56 $g/cm^3$.

In Japanese Patent Application Laid-Open No. H11-283627 a lithium secondary battery with a negative electrode including silicon and tin with an amorphous phase. In U.S. Pat. Nos. 6,517,974 and 6,569,568, a lithium secondary battery has been proposed which has as an active material a composite comprised of a positive electrode active material of negative electrode active material with an amorphous phase and a material such as a metal which is electrochemically inactive to substances other than lithium. In Japanese Patent Application Laid-Open No. 2000-311681, a lithium secondary battery has been proposed which uses a negative electrode comprised of particles of an alloy of amorphous tin and a transition metal of a non-stoichiometric composition. In WO 00/17949, a lithium secondary battery has been proposed which uses a negative electrode comprised of particles of an alloy of amorphous silicon and a transition metal of a non-stoichiometric composition.

The lithium secondary battery which uses the above described alloy as a negative electrode can realize a higher capacity and reduce volume expansion at the time of charging. However, also in the above described alloy, lithium is stored in a lattice of silicon or tin at the time of charging to form a lithium alloy. Therefore, the volume expansion is still present and the increase in internal resistance of the battery caused by the repeated charge and discharge is not completely successfully restrained. In addition, since the rate of forming a lithium alloy caused at the time of charging is not so high, it cannot be said that there is no possibility of occurrence of decomposition of an electrolyte solution and deposition of metal lithium onto a negative electrode surface at the time of rapid charging depending on the design of the battery structure. Therefore, there is a need for the development of an energy storage device which maintains high capacity characteristic, has a high power density, and allows rapid charging.

On the other hand, the electric double layer capacitor which uses active carbon with a large specific surface area for a negative electrode and a positive electrode and stores electricity in an electric double layer allows rapid charging and has a large capacity, and is therefore expected as a power source for a hybrid vehicle. The electric double layer capacitor has such a long life as to withstand a charge/discharge frequency about 10 to 100 times greater than the "lithium ion battery" and has a higher power density which is approximately 5 times that of the "lithium ion battery". On the other hand, the electric double layer capacitor is lower in energy density than the "lithium ion battery", that is, approximately ⅒ to ½ of that of the "lithium ion battery" in specific energy and approximately ¹⁄₅₀ to ½ of that of the "lithium ion battery" in energy density and has not yet been adopted as a power source for a movable body. Therefore, there is a need for the development of an energy storage device that makes use of the above described characteristics of the electric double layer capacitor, maintaining the advantages of allowing rapid charging, having a long life in repetition use and having a high power density, and has an improved energy density.

In order to solve the problems of the above described electric double layer capacitor, there have been made a proposal of using for an electrode a carbon material which can store/release lithium ions or anions at the time of charging/discharging and a proposal for a hybrid capacitor that uses for an electrode a metal oxide material which can store/release lithium ions at the time of charging/discharging. Such proposals have been made in, for example, Japanese Patent Application Laid-Open Nos. S60-170163, H2-181365, H4-34870, H8-107048, 2000-340470, 2002-25867, 2004-079321, 2005-086113, 2000-268881, 2003-109873, 2003-224037, 2004-103669, and 2004-178828, and Journal of The Electrochemical Society, 148 A930-A939 (2001).

In Japanese Patent Application Laid-Open No. S60-170163, a battery (energy storage device) has been proposed in which a polyacene material which is electrochemically dopable with ions is used for a negative electrode and/or a positive electrode. In Japanese Patent Application Laid-Open No. H2-181365, a capacitor has been proposed in which a polyacene material is used for both a positive and a negative electrodes and a quaternary ammonium salt is used for an electrolyte. In Japanese Patent Application Laid-Open No. H4-34870, a battery (energy storage device) has been proposed in which a polyacene material having lithium carried thereon is used for a negative electrode.

In Japanese Patent Application Laid-Open No. H8-107048, a capacitor has been proposed in which a carbon material having lithium occluded therein is used for a negative electrode and active carbon is used for a positive electrode. In Japanese Patent Application Laid-Open No. 2000-340470, a capacitor has been proposed in which an electrode of a carbon material with micropores containing a metal or a metal compound is used for each of a positive and a negative electrodes. In Japanese Patent Application Laid-Open No. 2002-25867, an electric double layer capacitor has been proposed in which an electrode formed of non-porous carbon including graphite-like microcrystalline carbon having electrolyte ions together with a solvent intercalated between layers is used for each of a positive and a negative electrodes.

In Japanese Patent Application Laid-Open No. 2004-079321, an energy storage device has been proposed in which a composite porous material having a carbon material deposited on an active carbon surface is used for a negative electrode and active carbon is sued for a positive electrode. In Japanese Patent Application Laid-Open No. 2005-086113, an electric double layer capacitor has been proposed which includes an electrode member having pores larger than electrolyte ions obtained by electrically activating a carbon member.

On the other hand, a metal oxide is proposed to be used for an electrode material. In Japanese Patent Application Laid-Open No. 2000-268881, an electrochemical capacitor has been proposed in which an electrode including lithium vanadium oxide and a conductive filler is used for a negative electrode and an electrode including active carbon is used for a positive electrode. In Japanese Patent Application Laid-Open No. 2003-109873, an electric double layer capacitor has been proposed in which a conductive porous ceramic material with a mesoporous structure is used for an electrode. In Japanese Patent Application Laid-Open No. 2003-224037, an electric double layer capacitor has been proposed which uses an electrode obtained by coating a conductive ceramic material on a surface of a porous material.

In Japanese Patent Application Laid-Open No. 2004-103669, a capacitor has been proposed in which a fine carbon powder coated with a metal oxide, a metal nitride or a metal carbide is used as an electrode material. In Japanese Patent Application Laid-Open No. 2004-178828, a nonaqueous lithium energy storage device has been proposed in which a composite porous material having a carbonaceous material deposited on an active carbon surface is used for a negative electrode, an amorphous metal oxide containing at least one of Mn and V is used for a positive electrode and includes a lithium salt as an electrolyte. In Japanese Patent Application Laid-Open No. 2005-108595, an electrode for an electrochemical device has been proposed which contains a tetratitanic acid nanosheet represented by $H_2Ti_8O_{17} \cdot nH_2O$ (n=0–2.0) and a carbon material. In U.S. Pat. No. 6,252,762, a rechargeable energy storage system has been proposed in which a material that reversibly intercalates cations such as alkali metal ions such as $Li_4Ti_5O_{12}$ is used for a negative electrode and a material that reversibly adsorbs anions is used for a positive electrode. In addition, in Journal of The Electrochemical Society, 148 A930-A939 (2001), a nonaqueous energy storage cell has been reported which is prepared using a negative electrode including $Li_4Ti_5O_{12}$ and a positive electrode including active carbon.

However, any one of the energy storage devices such as a capacitor according to the above described proposals has an energy density which is ⅒ or less of that of a lithium secondary battery (including lithium ion battery), so that further increase in energy density is desired.

Accordingly, there is a continuing need for the development of an energy storage device which has a high energy density close to the energy density of the lithium secondary battery and has a rapid charging performance and a high power density performance for a capacitor.

SUMMARY OF THE INVENTION

Therefore, the present invention provides a powder material that can electrochemically store and release a large amount of lithium ions in a high current density. Further, the present invention provides an electrode structure formed of the powder material and an energy storage device which includes the electrode structure, has less reduction in capacity due to repeated charge/discharge, and also has a high power density and a high energy density.

The term "energy storage device" herein employed refers to a capacitor, a secondary battery, a device including a capacitor and a secondary battery in combination, and a device including any one of such devices and further having a power generation function incorporated therein.

That is, according to a first aspect of the present invention, there is provided a powder material which allows lithium ions to be stored therein and released therefrom electrochemically, including a composite including particles of one of silicon, tin, and an alloy of at least one of silicon and tin, and one of a metal oxide and a semi-metal oxide, wherein a Gibbs free energy when one of a metal and a semi-metal constituting the one of the metal oxide and the semi-metal oxide is oxidized is smaller than a Gibbs free energy when the one of silicon, tin, and the alloy contained in the particles is oxidized, and wherein a weight ratio of the one of the metal oxide and the semi-metal oxide to the particles in the composite is within a range of 1/99 to 3/7.

According to a second aspect of the present invention, there is provided an electrode structure including a current collector and an electrode material layer formed of an active material including the powder material set forth above.

According to a third aspect of the present invention, there is provided an energy storage device which includes a negative electrode using the electrode structure set forth above, a lithium ion conductor, and a positive electrode including a positive electrode active material layer, and a current collector, and which utilizes an oxidation reaction of lithium and a reduction reaction of lithium ion.

According to a fourth aspect of the present invention, there is provided a powder material which allows lithium ions to be stored therein and released therefrom electrochemically, including particles of one of silicon, tin, and an alloy of at least one of silicon and tin, and an oxide covering a surface of the particles and including at least one element selected from the group consisting of W, Ti, Mo, Nb, V, Ta, B, Ce, Al, Ba, Zr, Sr, Mg, Th, Be, La, Ca, and Y.

According to a fifth aspect of the present invention, there is provided a powder material which allows lithium ions to be stored therein and released therefrom electrochemically, including an aggregate of particles each including a plurality of fine regions of microcrystalline or amorphous material including one selected from silicon, tin, and an alloy of at least one of silicon and tin, and a fine region including an oxide including at least one element selected from the group consisting of W, Ti, Mo, Nb, V, Ta, B, Ce, Al, Ba, Zr, Sr, Mg, Th, Be, La, Ca, and Y.

According to a sixth aspect of the present invention, there is provided a method of producing a powder material, which includes adding particles of one of silicon, tin, and an alloy of at least one of silicon and tin to a dispersion liquid having dispersed therein nanoparticles of an oxide containing at least one element selected from the group consisting of W, Ti, Mo, Nb, V, Ta, B, Ce, Al, Ba, Zr, Sr, Mg, Th, Be, La, Ca, and Y; and evaporating the liquid of the dispersion liquid.

According to a seventh aspect of the present invention, there is provided a method of producing a powder material, which includes mixing particles of one of silicon, tin, and an alloy of at least one of silicon and tin with an oxide material containing at least one element selected from the group consisting of W, Ti, Mo, Nb, V, Ta, B, Ce, Al, Ba, Zr, Sr, Mg, Th, Be, La, Ca, and Y; and milling the particles and the oxide material to form a composite.

According to a eighth aspect of the present invention, there is provided a method of producing a powder material, which includes mixing a powder of a source material selected from silicon, tin, and an alloy of at least one of silicon and tin with an oxide material containing at least one element selected from the group consisting of W, Ti, Mo, Nb, V, Ta, B, Ce, Al, Ba, Zr, Sr, Mg, Th, Be, La, Ca, and Y; and milling the mixed source material and the oxide material to form a composite.

According to a ninth aspect of the present invention, there is provided a method of producing a powder material, which includes adding particles of one of silicon, tin, and an alloy of at least one of silicon and tin to a dispersion liquid in which nanoparticles of an oxide containing at least one element selected from the group consisting of W, Ti, Mo, Nb, V, Ta, B, Ce, Al, Ba, Zr, Sr, Mg, Th, Be, La, Ca, and Y are dispersed in an organic solvent or water and performing dispersion; and evaporating the solvent to perform drying.

According to a tenth aspect of the present invention, there is provided a method of producing a powder material, which includes mixing a powder of a source material selected from silicon, tin, and an alloy of at least one of silicon and tin with one of metal oxide fine powder and semi-metal oxide fine powder, heating the mixture up to a melting point of the source material in an inert gas atmosphere and melting the mixture to prepare a melt having the one of the metal oxide fine powder and the semi-metal oxide micro powder dispersed therein; and (A) spraying the melt by an atomization process to form particle powder; or (B) cooling the melt to prepare an ingot and grinding the ingot to form particle powder.

According to an eleventh aspect of the present invention, there is provided a energy storage device which utilizes oxidation/reaction of lithium, including an electrode including a powder material including particles of a transition metal compound selected from a transition metal oxide, a transition metal phosphate compound, a lithium transition metal oxide, and a lithium transition metal phosphate compound, has an amorphous phase, and forms a composite with one of a metal oxide and a semi-metal oxide.

A first characteristic of the present invention is that a metal powder capable of storing and discharging lithium by an electrochemical reaction selected from silicon, tin, and an alloy containing at least one silicon and tin is made to form a composite with a metal oxide which exists thermodynamically more stably than tin oxide or silicon oxide and contains such a metal as to have a Gibbs free energy of an oxidation reaction thereof which is a larger negative value than a Gibbs free energy of an oxidation reaction of tin or silicon. It is preferable that the alloy of silicon or tin and the alloy including silicon and tin are amorphous or microcrystalline.

Moreover, a second characteristic of the present invention is that the composite powder material capable of storing and releasing lithium by an electrochemical reaction includes an aggregate of particles each comprising a plurality of fine regions of microcrystalline or amorphous material comprising one selected from silicon, tin, and an alloy of at least one of silicon and tin, and a fine region of a metal oxide including the metal element as a main component.

It is preferable that the alloy containing at least one of silicon and tin is an alloy selected from an alloy of silicon and a transition metal, an alloy of tin and a transition metal, and an alloy of silicon, tin, and a transition metal. The transition metal element can be an element which is not electrochemically alloyable with Li and is selected from the group consisting of Cu, Ni, Co, Ti, Fe, Cr, Mo, W, Pd, Pt, and Au, and alloy of Cu, Ni, Co, Ti, Fe, Cr, Mo, W, Pd, Pt, or Au. The crystallite of the region of metal or alloy particles of the powder material preferably has a size of 100 nm or less.

The metal oxide or semi-metal oxide can be one of oxides and composite oxides containing a metal element selected from the group consisting of Mo, W, Nb, Ta, V, B, Ti, Ce, Al, Ba, Zr, Sr, Th, Mg, Be, La, Ca, and Y as a main component.

Moreover, the powder material may be a composite including carbon. In that case, the weight ratio of the carbon element to the particles of one of the silicon metal, tin metal, and an alloy of at least one of silicon and tin is preferably within the range of 0.05 to 1.0.

The average particle diameter of the powder is preferably within the range of 0.05 to 5 µm.

A third characteristic of the present invention is that, in order to provide an energy storage device with a high energy density and a high power density, in the compositional ratio of the powder material capable of storing and releasing lithium by an electrochemical reaction, the weight ratio of the one of the metal oxide and the semi-metal oxide to the particles in the composite is set within a range of 1/49 to 1/4.

A fourth characteristic of the present invention is that the electrode structure includes a powder material including a composite including one of silicon metal, tin metal, and an alloy of any of silicon and tin and the metal oxide or semimetal oxide, and a current collector.

A fifth characteristic of the present invention is an energy storage device utilizing a lithium oxidization-reaction and a lithium ion reduction-reaction and including a negative electrode, a lithium ion conductor, and a positive electrode, in which the negative electrode is the above-mentioned electrode structure.

In addition, another characteristic of the present invention is that the active material constituting a positive electrode of the energy storage device is selected from the group consisting of a carbon material, and amorphous or microcrystalline transition metal oxide, transition metal phosphate compound, lithium transition metal oxide, and lithium transition metal phosphate compound. Moreover, it is preferable that the positive electrode active material has an amorphous phase, and forms a composite with an oxide or composite oxide containing an element selected from the group consisting of Mo, W, Nb, Ta, V, B, Ti, Ce, Al, Ba, Zr, Sr, Th, Mg, Be, La, Ca, and Y as main a component, and the contribution rate of the oxide or composite oxide with respect to an amount of charged/discharged electricity is 20% or less, Zr, Sr, Th, Mg, Be, La, Ca and Y as a main component.

ADVANTAGES OF THE INVENTION

An energy storage device of the present invention in utilization of electrochemical oxidization reduction reaction of lithium ion will be capable of rapid charging and providing high power density and high energy density and of securing charge and discharge cycle lifetime as well.

Further features of the present invention will become apparent from the following description of exemplary embodiments with reference to the attached drawings.

DESCRIPTION OF THE EMBODIMENTS

Figure 1:
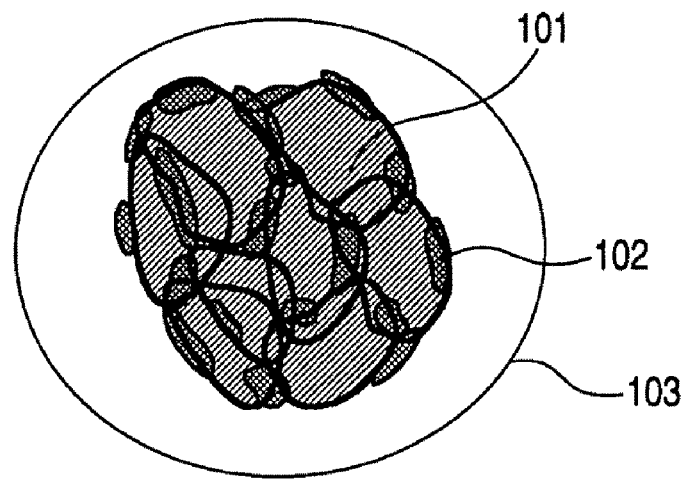
FIG. 1 is a schematic section of an example of powder material of the present invention.

According to the energy storage device of the present invention which utilizes an electrochemical oxidation/reduction reaction of lithium ions, rapid charging, a high power density, and a high energy density can be attained, and a longer charge/discharge cycle life can be secured.

The present inventor has studied the alloy negative electrode for a lithium secondary battery in detail and accomplished the present invention. In a lithium secondary battery using an electrode, as a negative electrode, in which an electrode material layer (active material layer) including a powder of silicon metal, tin metal, and an alloy of at least one of silicon and tin and a binder is formed on a current collector of a metal foil, the internal resistance of the battery increases due to repeated charge/discharge, giving rise to reduction in the performance. In particular, an increase in a charge current density is seriously influential to significantly reduce the performance. The present inventors have observed and analyzed an active material of such a negative electrode and speculated that the following is the cause for the reduction in the performance. During charging, the electric field intensity on particles of silicon metal, tin metal and an alloy of any of silicon and tin is uneven, so that lithium deposition is liable to occur in a portion with a higher electric field intensity and lithium diffusion occurs unevenly in the alloy lattice, thereby causing uneven expansion/collapse of the alloy particles. Therefore, in order to restrain deposition of lithium metal coming into direct contact with an electrolyte solution by uniforming the electric field intensity on the alloy particles, adding a vinyl monomer or the like which forms a coating having a function of SEI (Solid Electrolyte Interface) or a passivating film at the time of charge/discharge to the electrolyte solution is effective to a certain extent. However, since the diffusion rate of lithium in an alloy is not so large, the uneven expansion/collapse of alloy particles becomes remarkable under a condition with a high charge/discharge current density, which may cause an irreversible side reaction. Consequently, a reduction in the discharge capacity and a shortage in the charge/discharge cycle life will be caused.

Therefore, the present inventor has found a method of suppressing uneven deposition/diffusion of lithium at the time of charging with respect to particles of silicon, tin or an alloy thereof which can electrochemically store lithium.

The present inventor has considered as the above mentioned means that primary particles of silicon metal, tin metal or an alloy thereof is made as fine (small) as possible to make diffusion of lithium ions at the time of charging/discharging more uniform and faster.

The material in which the performance of particles of silicon metal, tin metal or an alloy of at least one of silicon and tin which stores a large amount of lithium ions by a charging reaction is maintained and the performance of more uniform and faster diffusion of lithium ions at the time of charge/discharge is realized is a material in which particles of silicon metal, tin metal or an alloy thereof of an active material forms a composite with a thermodynamically stable metal oxide or semi-metal oxide. Incidentally, the term "silicon metal, tin metal, or an alloy thereof" herein employed refers to elemental silicon, elemental tin, and an alloy of at least one of silicon and tin.

The particles of silicon metal, tin metal, or an alloy thereof are separated into finer regions by the metal oxide or semi-metal oxide.

When an electrode formed of a powder material in which particles of silicon metal, tin metal, or an alloy thereof are thus made fine is used to prepare an energy storage device and lithium is electrochemically stored in the electrode by a charging reaction, the lithium can be uniformly diffused into the fine regions and rapid charging can be performed. Further, also when the stored lithium is released by a discharge reaction, the release can be performed uniformly and more rapidly.

This fine processing of particles of silicon metal, tin metal, or an alloy thereof promotes amorphization. The amorphization gives rise to a degree of freedom in the crystal structure, thereby alleviating the stress during insertion/release of lithium. In order to make fine the particles of silicon metal, tin metal, or an alloy thereof, a carbide or nitride of ceramic other than the metal oxide and semi-metal oxide can be used as a composite forming material. However, from the viewpoint of junction with particles of silicon metal, tin metal, or an alloy thereof, the metal oxide or semi-metal oxide is most desirable. The reason therefor is that the surface of the particles contains more or less oxide film and can form good junction with the metal oxide or semi-metal oxide through the oxygen element therein.

In addition, particles of silicon metal, tin metal, or an alloy thereof includes a portion covered with an oxide film on its surface formed by a reaction with oxygen contaminated at the time of production thereof. That portion and the metal oxide or semi-metal oxide form good bonding through oxygen atoms. Consequently, a powder material of an aggregation of particles in which particles of silicon metal, tin metal, or an alloy thereof are bound by particles of the metal oxide or semi-metal oxide will be formed. The structure of the particles forming the composite is constituted by an aggregation of particles including a plurality of fine regions of a microcrystalline or amorphous state of silicon metal, tin metal, or an alloy thereof and a fine region of the metal oxide or semi-metal oxide. When viewing the particle in its entirety, the structure is such that the metal oxide or semi-metal oxide (including composite oxide) is dispersed in silicon metal, tin metal, or an alloy thereof. Further, when viewing from the fine particle of silicon metal, tin metal, or an alloy thereof, the structure is such that a part or all of the surface thereof is coated with the metal oxide or semi-metal oxide (including composite oxide) and the metal oxide or semi-metal oxide is disposed at an interface between the fine particles.

In addition, it is necessary that the metal oxide or semi-metal oxide (including composite oxide) is stable at a temperature at the time of composite formation and particles of silicon metal, tin metal, or an alloy thereof for storing lithium therein do not deprive oxygen from the metal oxide or semi-metal oxide to be oxidized. The thermodynamically stable metal oxide or semi-metal oxide can be selected from Ellingham Diagrams which indicates the stability of an oxide as a function of temperature. As the oxide, firstly, an oxide is preferred which exists thermodynamically more stably than tin oxide and is an oxide of such a metal as to have a Gibbs free energy of an oxidation reaction thereof which is a larger negative value than a Gibbs free energy of an oxidation reaction of tin. Specifically, the oxide can be one of oxides and composite oxides which contain a metal element selected from the group consisting of Mo, W, Nb, Ta, V, B, Ti, Ce, Al, Ba, Zr, Sr, Th, Mg, Be, La, Ca, and Y as a main component. Moreover, as the oxide, an oxide is preferred which exists thermodynamically more stably than silicon oxide and is an oxide of such a metal as to have a Gibbs free energy of an oxidation reaction thereof which is a larger negative value than a Gibbs free energy of an oxidation reaction of silicon. Specifically, the metal oxide or semi-metal oxide can be one of oxides and composite oxides which contain a metal element selected from the group consisting of B, Ti, Ce, Al, Ba, Zr, Sr, Th, Mg, Be, La, Ca, and Y as a main component. In addition, it is preferable that the bond dissociation energy of the above-mentioned metal oxide or semi-metal oxide is larger than that of $Li_2O$.

In addition, it is considered that particles of silicon metal, tin metal, or an alloy handled in the atmosphere have an oxide film coated on the surface thereof, which restrains conduction of electrons and conduction of lithium ions between particles so as to be low to thereby restrain the charge/discharge performance. The use of a lithium ion conductive oxide as the metal oxide or semi-metal oxide for use in the composite formation allows diffusion of lithium ions between particles to be performed more easily. In the case of being contained in an electrode of an energy storage device, the lithium ion conductive oxide is preferably a material which is small in volume expansion/shrinkage during charge/discharge (including lithium insertion/release reaction) and is stable in crystal structure. Moreover, it is preferable that the lithium ion conductive oxide has an oxidization/reduction potential which is nobler than that of silicon or tin and is baser than that of the positive electrode active material. The reason therefor is that a charge/discharge reaction at an electrolyte solution interface proceeds smoothly.

As the lithium ion conductive oxide, there are included oxides of transition metal elements typified by W, Ti, Mo, Nb, and V, which have excellent characteristics of having less change in crystal structure such as expansion and being stable even when intercalating lithium and having a high diffusion rate of lithium ions.

In the energy storage device using, as the negative electrode active material, the powder material in which the lithium ion conductive oxide forms a composite, lithium ions are expected to be intercalated by the transition metal oxide or semi-metal oxide of the active material at the initial stage of charging at the time of transition from discharging to charging. At the time when lithium is intercalated and the potential of the transition metal oxide or semi-metal oxide becomes baser that that of the metal region of silicon, tin or an alloy thereof which is another constituent element of the powder material, the transition metal oxide or semi-metal oxide and the metal region are joined to each other, so that until the both become the same potential, lithium ions automatically diffuse into the metal region from the transition metal oxide or semi-metal oxide region, whereby lithium ions are stored in the metal region more uniform and smoothly.

Description has been made by taking, as an example, fine processing of particles of silicon metal, tin metal, or an alloy thereof by composite formation with the metal oxide or semi-metal oxide.

For the fine processing of particles of the positive electrode active material constituting the positive electrode of the energy storage device, the composite formation with the metal oxide or semi-metal oxide can be utilized. The composite formation also promotes amorphization of the positive electrode active material. As with silicon metal, tin metal, or an alloy thereof, the fine processing and amorphization of the positive electrode active material increases the specific surface area. Therefore, since the unit of particles involved in charge/discharge becomes smaller, the utilization factor for active material in charge/discharge increases, so that adsorption and reaction of ions involved in charging/discharging can be performed uniformly and rapidly. Consequently, the energy storage capacity of the energy storage device using the positive electrode produced from the positive electrode active material of particles made fine by composite formation increases while the energy density and the power density also increase.

As the metal oxide or semi-metal oxide for composite formation with the positive electrode active material can be one of oxides and composite oxides which have a contribution rate with respect to the amount of charged/discharged electricity of 20% or less and contain a metal element selected from the group consisting of Mo, W, Nb, Ta, V, B, Ti, Ce, Al, Ba, Zr, Sr, Th, Mg, Be, La, Ca and Y as a main component. The weight ratio of the metal oxide or semi-metal oxide for composite formation to the positive electrode active material is preferably within the range of 0.01:1 to 0.2:1, more preferably within the range of 0.02:1 to 0.1:1. More specific examples of the metal oxide or semi-metal oxide for composite formation include $WO_2$, $TiO_2$, $MoO_2$, $Nb_2O_5$, $MoO_3$, $WO_3$, $Li_4Ti_5O_{12}$, $Li_2Nb_2O_5$, $LiNbO_3$, $LiWO_2$, $LiMoO_2$, $LiTi_2O_4$, $Li_2Ti_2O_4$, $H_2Ti_{12}O_{25}$, $Na_2Ti_{12}O_{25}$, $Al_2O_{13}$, $Al_2O_3 \cdot Na_2O$, $MgO$, $ZrO_2$, and $La_2O_3$. The ratio of elements in these oxides does not necessarily to be stoichiometric.

With reference to FIGS. 1 to 6, embodiments of the present invention will be described.

Figure 2:
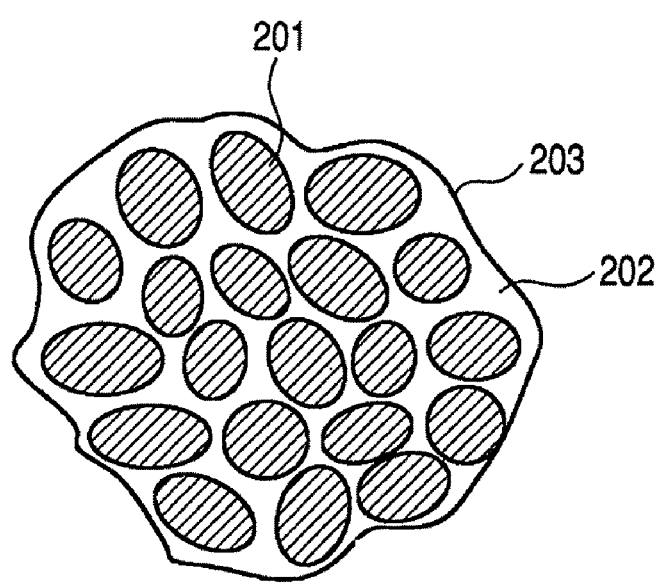
FIG. 2 is a schematic section of an example of powder material of the present invention.

FIGS. 1 and 2 illustrate schematic sections of a powder material of the present invention. In FIG. 1, 101 denotes a particle of silicon metal, tin metal, or an alloy thereof; 102 denotes a metal oxide or semi-metal oxide which forms a composite with the particle 101; and 103 denotes a powder material of the present invention which is used as an active material of an electrode of an electrochemical device, in particular, of an electrode of an energy storage device and can also be used as an electrode material of other electrodes for electrolysis or electrochemical synthesis. In addition, the powder material can be used as a photocatalyst for decomposing water or an organic matter by light irradiation. The particles 101 of silicon metal, tin metal, or an alloy thereof aggregate to form secondary particles. At least one of the primary particles and secondary particles are covered partly or entirely by the metal oxide or semi-metal oxide 102. It is desirable that the particle 101 of silicon metal, tin metal, or an alloy thereof includes an amorphous phase and is microcrystalline or amorphous. Specific examples of the metal oxide or semi-metal oxide 102 include preferably oxides or composite oxides containing an element selected from the group consisting of Mo, W, Nb, Ta, V, B, Ti, Ce, Al, Ba, Zr, Sr, Th, Mg, Be, La, Ca, and Y as a main component, more preferably oxides or composite oxides containing an element selected from the group consisting of B, Ti, Ce, Al, Ba, Zr, Sr, Th, Mg, Be, La, Ca, and Y as a main component. As a specific example of a case where a lithium ion conductive metal oxide is used for the metal oxide for composite formation, there can be used oxides and lithium transition metal oxides containing a transition metal element selected from the group consisting of W, Ti, Mo, Nb, and V as a main component. For the metal oxide or semi-metal oxide, there is preferably used a material which allows lithium insertion/release, has a high lithium ion diffusion rate, and exhibits less volume expansion even in the case where lithium ions are intercalated. In the case where a negative electrode of an energy storage device utilizing oxidization/reduction of lithium ions is constituted by the powder material 103 of the present invention, the lithium ions diffuse rapidly and uniformly into the fine particles 101 of silicon metal, tin metal, or an alloy thereof in the powder material 103 at the time of charging. In addition, in the case where the lithium ion conductive metal oxide or semi-metal oxide is adapted for the metal oxide or semi-metal oxide 102 in the powder material 103, lithium ions are intercalated by the metal oxide or semi-metal oxide 102 layer of the powder material 103 at the time of charging, and at the time when a potential difference occurs between the metal oxide or semi-metal oxide 102 layer and the particles 101 of silicon metal, tin metal, or an alloy thereof, lithium in the metal oxide or semi-metal oxide 102 layer rapidly diffuses into the particles 101. In addition, the metal oxide or semi-metal oxide layer 102 functions as a SEI (Solid Electrolyte Interface) or a passivating film for the particles 101 for storing lithium. Since the particles 101 including silicon metal, tin metal, or an alloy thereof are not directly exposed and hardly contact an electrolyte solution directly in an energy storage device, a side reaction that decomposes the electrolyte solution at the time of charging will hardly take place. Since silicon and tin are both liable to form an oxide, the metal oxide or semi-metal oxide 102 layer and the particles 101 of silicon metal, tin metal, or an alloy thereof are affinitive with each other and a good interface is formed through oxygen atoms, so that the diffusion of lithium therebetween proceeds uniformly. The power density and energy density of an energy storage device using the powder material 103 as an active material can be adjusted to a certain extent by changing the ratio of the particles 101 to the metal oxide or semi-metal oxide 102. That is, when increasing the ratio of the metal oxide or semi-metal oxide 102, the power density can be increased. On the other hand, when increasing the ratio of the particles 101, the energy density can be increased.

In addition, use of only particles 101 of silicon metal, tin metal, or an alloy thereof in the form of fine powder will easily result in oxidization of the particles by the reaction with oxygen or water in the atmosphere. However, the coating thereof with the metal oxide or semi-metal oxide 102 layer restrains oxidization and handling thereof in the atmosphere can be made easy. In addition, the stability with less chemical change even in storage for a long period of time can present stable performance in the case of being used as an electrode material for an energy storage device. Incidentally, the average diameter of (secondary particles) the powder material is preferably within the range of 0.05 to 5 µm from the viewpoint of easy handleability, more preferably within the range of 0.1 to 3 µm.

FIG. 2 illustrates a plurality of fine regions 201 of silicon metal, tin metal, or an alloy thereof, region 202 of the metal oxide or semi-metal oxide, and a primary particle 203 of a powder material (main active material) that can be used for an active material of an electrode of an energy storage device of the present invention. The particle 203 constituting the powder material of the present invention is structured to be constituted by a plurality of fine regions 201 of silicon metal, tin metal, or an alloy thereof such that the metal oxide or semi-metal oxide 202 is disposed at an interface between the fine regions, which is more ideal than a structure in which fine regions of silicon metal, tin metal, or an alloy thereof of an amorphous or microcrystalline state are dispersed in a matrix of the metal oxide or semi-metal oxide 202. Since the metal regions of silicon metal, tin metal, or an alloy thereof in the particle are not directly exposed and do not contact an electrolyte solution directly in an energy storage device, a side reaction that decomposes the electrolyte solution at the time of charging will hardly take place. In addition, although a metal fine powder is generally liable to be oxidized in the atmosphere, the powder material including the particles 203 is hardly liable to be oxidized in the atmosphere and can easily be handled. The silicon metal, tin metal, or an alloy thereof and the metal oxide or semi-metal oxide are affinitive with each other, so that the interface thereof formed in a continuous manner through oxygen atoms.

Therefore, in the case of Li insertion/release into or from the powder material electrochemically, lithium diffusion between the metal oxide or semi-metal oxide region and the metal region will be performed smoothly and uniformly. In addition, by making fine the region of silicon metal, tin metal, or an alloy thereof which can store lithium in a high concentration, a more uniform and rapid lithium insertion/release reaction (than a case where the regions are large) can be performed. Incidentally, in order to make easy the diffusion of lithium in the metal region 201, the size of the metal region 201 is preferably within the range of 5 nm to 500 nm, more preferably within the range of 10 nm to 100 nm. The powder material constituted of the particles 203 is used as an active material of an electrochemical device, in particular, as an active material of an electrode of an energy storage device and can also be used as an electrode material of other electrodes for electrolysis and electrochemical synthesis. In addition, the powder material can be used as a photocatalyst for decomposing water or organic matters by light irradiation. The power density and energy density of an energy storage device using the particles 203 as an electrode material can be adjusted by changing the ratio of the regions 201 to the metal oxide or semi-metal oxide region 202 in FIG. 2, as with the change of the ratio of the particles 101 to the metal oxide or semi-metal oxide 102. That is, when increasing the ratio of the metal oxide or semi-metal oxide region 202, the power density can be increased. On the other hand, by increasing the ratio of the fine regions 201, the energy density can be increased.

In addition, the particle 101 illustrated in FIG. 1 may be the particle 203 illustrated in FIG. 2. That is, a secondary particle formed of an aggregation of the particles 203 of FIG. 2 may be coated with the metal oxide or semi-metal oxide to form the particle 103.

As for the component ratio of the powder material of the present invention such as shown in FIGS. 1 and 2, the weight ratio of the metal oxide or semi-metal oxide for composite formation to the composite particles of silicon metal, tin metal, or an alloy thereof is preferably within the range of 1/99 to 3/7, more preferably within the range 1/49 to 1/4. The component ratio may be determined also depending on the performance required for an energy storage device.

Figure 3A:
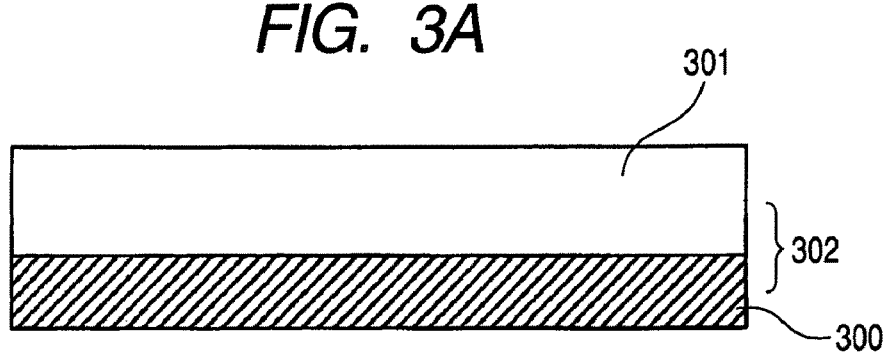
FIGS. 3A, 3B, and 3C are schematic sections of examples of electrode structures of the present invention.
Figure 3B:
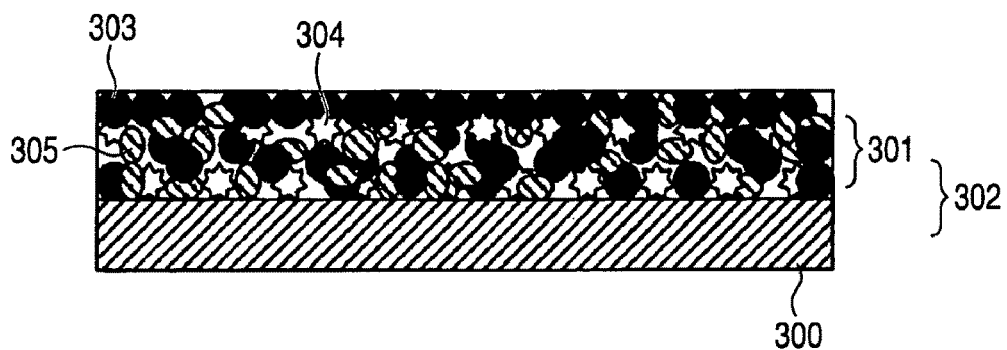
Figure 3C:
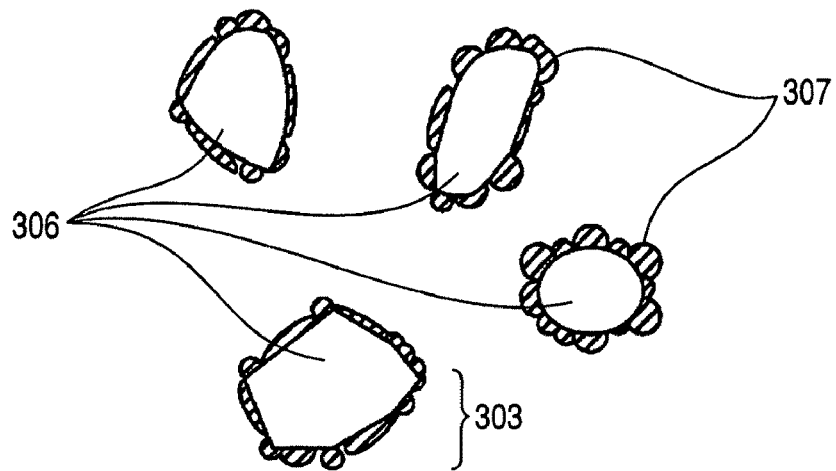

FIGS. 3A and 3B are schematic cross-sectional views of electrode structures of electrochemical devices of the present invention. In FIGS. 3A and 3B, there are illustrated a current collector 300, an electrode material layer 301, an electrode structure 302, an active material 303 including the powder material comprised of the particles 103 of FIG. 1 or the primary particles 203 of FIG. 2, a conductive auxiliary material 304, and a binder 305. FIG. 3C illustrates an example in which the electronic conductivity among particles is improved by coating the surface of an active material 306 (main active material particle) with carbon (carbon powder) 307. In this example, when carbon is used for the conductive auxiliary material 304, the electronic conductivity with the conductive auxiliary material particles can also be improved. As the active material 306 of an electrode of the electrochemical device of the present invention, the particles 103 of FIG. 1 or the primary particles 203 of FIG. 2 may be used.

(Main Active Material)

The electrode material layer includes active materials being at least electrochemically active. An active material occupying more than 50% by weight of the above active materials will be called "main active material" here. The main active material can be composite particles obtained by forming a composite of particles of silicon, tin or an alloy thereof which are the powder material of the present invention and metal oxide or semi-metal oxide. Here, the "forming a composite" does not mean formation of a mere mixture but formation of a substance having a state where a plurality of heterogeneous materials comes into junction. That is, the main active material includes particles where a region of the above metal and a region of one of the metal oxide and the semi-metal oxide are brought into junction. The mere mixture is simply separated by ultrasonic irradiation or the like. Active materials other than the main active material are selected from the group consisting of active carbon, graphite, hard carbon, metal oxide and semi-metal oxide and may be used at an amount less than 50% by weight.

The metal region portion of the composite particles which are the powder material of the present invention preferably contains at least silicon and/or tin and a transition metal element, and more preferably are an alloy thereof. The transition metal element contained in the metal region can include Co, Cu, Ni, Fe, Ti, Cr, Ag, Nb and Zr. An element other than the transition metal element contained in the metal region can include Mg, Ba, Sr, Ca, La, Ce, Ge, C, P, B, Bi, Sb, Al, In, Ga, Zn and Li. The other minor quantity element contained in the metal region can include F, N and O may be contained. In addition, in order to produce an electrode for an electrochemical device of the present invention, in particular, for an energy storage device, it is desired that the average particle diameter of powder as the aggregate of the above-described composite particles can be controlled to fall within a range of 0.05 to 5 μm, and preferably within a range of 0.1 to 3 μm.

The metal (alloy) region of the composite particles can be microcrystalline or amorphous. The crystalline size thereof can be preferably 100 nm or less and more preferably 20 nm or less. In the present invention, the size of the crystallite of the particles can be determined by a transmission electron microscope image, selected-area electron beam diffraction, and the following Scherrer equation including half-value width of the peak of an X-ray diffraction curve and diffraction angle.

$$Lc=0.94\lambda/(\beta \cos \theta) \quad \text{(Scherrer's equation)}$$

Lc: Crystallite size
λ: Wavelength of X-ray beam
β: Half-value width of peak (radian)
θ: Bragg angle of diffraction line The half-value width of diffraction intensity with respect to 2θ of the primary peak of X-ray diffraction chart for the metal region of the main active material of the present invention can be 0.1° or more and more preferably 0.2° or more. Progress in the amorphous state is better. The insertion and release reaction of lithium is considered to occur from the grain boundary of crystals. By making crystals of silicon, silicon alloy, tin or tin alloy into microcrystalline or amorphous, a lot of grain boundaries are produced. Thereby, insertion and release reaction of lithium is uniformly carried out to increase energy storage device capacity and improve efficiency of charge and discharge. Formation of a crystal into a microcrystalline state or an amorphous state will deprive crystal of long-distance orderliness in a crystal structure. Therefore, the degree of freedom increases to lessen change in a crystal structure at the time of lithium insertion. Consequently, expansion thereof at the time of lithium insertion becomes smaller.

The average particle diameter of the primary particle forming the composite particles as the powder material of the present invention can fall within the range of 5 nm to 500 nm and can further fall within the range of 10 nm to 100 nm.

The metal oxide or semi-metal oxide region of the composite particles is not limited to be crystalline but may be microcrystalline and amorphous. When transition metal oxide is used as the metal oxide or semi-metal oxide, the transition metal oxide can be oxide including, as a main component, a transition metal element selected from the group consisting of W, Ti, Mo, Nb and V. In addition, the transition metal oxide may be a composite oxide with lithium such as $Li_4Ti_5O_{12}$ for example. In addition, the metal oxide may include oxides of transition metal elements selected from the group consisting of the above-described W, Ti, Mo, Nb and V a part of which is replaced by the other elements. The other elements can include the Group 1, Group 2, Group 12, Group 13, Group 14 of the periodic table, rare-earth elements, and transition metal elements other than W, Ti, Mo, Nb and V. An atom ratio of the other elements to the transition metal elements selected from the group consisting of W, Ti, Mo, Nb and V can be 1.0 or less and can further be 0.5 or less.

(Method of Producing Powder Material)

The first method as the method of producing a powder material in the present invention is a method of mixing a powder of metal of silicon, tin or an alloy metal oxide with a powder of metal oxide or semi-metal oxide used for forming a composite, carrying out grinding (mechanochemical, mechanical milling, or mechanical alloying) treatment with a mill such a planetary mill, a vibratory ball mill, an attritor or the like, and forming a composite. The treatment for forming a composite further micronizes the particles of metal of silicon or tin, or an alloy thereof and the particles of metal oxide or semi-metal oxide used for forming a composite, thereby obtaining the powder material of the present invention as shown in FIG. 1 or FIG. 2 where metal oxide or semi-metal oxide is arranged on the grain boundary thereof. In order to enhance electronic conductivity of composite particles at the time of forming composite particles, carbon material such as graphite, amorphous carbon, carbon nanofiber, and carbon nanotube may be added to the composite particles.

The second method is a method of mixing a raw material powder of silicon or tin or an alloy including at least one of silicon and tin with a powder of metal oxide or semi-metal oxide, and grinding (mechanochemical, mechanical milling or mechanical alloying) treatment with a mill such as a planetary mill, a vibratory ball mill, an attritor or the like to form composite particles at once. In order to enhance electronic conductivity of the composite particles at the time of production, carbon materials such as graphite, amorphous carbon, carbon nanofiber, and carbon nanotube may be added to the composite particles.

The third method is a method of coating the surface of the particles of metal of silicon or tin or an alloy thereof with a metal oxide or a semi-metal oxide. More specifically, the powder material of the present invention is obtained by dispersing powder (secondary particles) of metal of silicon or tin or an alloy having an average particle diameter ranging from 0.05 to 5 μm and preferably 0.1 to 3 μm in a dispersion solution of nanoparticles of metal oxide or semi-metal oxide as a raw coating material dispersed in an organic solvent or water, and then evaporating the solvent for removing it to dry or undergo heat treatment. The shape of the nanoparticles can have a shape selected from a grain shape, a sheet shape, a tube shape and filament shape. The nanoparticles are desired to be amorphous. In addition, the nanoparticles can be prepared by a method such as sol-gel method, for example. The heat treatment temperature can fall within the range of 100 to 700° C. The solvent can be removed and dried with a spray drier, for example. The heat treatment in excess of 700° C. promotes crystallization of particles of the above metal and alloy to shorten the lifetime in repetition of charge and discharge of an energy storage device therewith and is not desirable. The heat treatment can performed under an atmosphere of an inert gas. The particle diameter or thickness of nanoparticles of the metal oxide or semi-metal oxide can fall within the range of 1 to 500 nm for coating with the metal particles or the alloy particles. The length in the case where the shape of nanoparticles is a sheet shape, a tube shape or a filament shape can fall within the range of 0.01 to 10 μm for coating with the metal particles or the alloy particles.

The fourth method is a method of mixing a powder of silicon or tin or an alloy including at least of silicon and tin with a fine powder of metal oxide or semi-metal oxide, heating and melting the mixture up to the melting point of the raw material of the alloy of silicon or tin under an inert gas, dispersing the fine powder of the metal oxide or semi-metal oxide, thereafter cooling the mixture, and subsequently producing a composite powder. In order to produce the composite powder, there is (1) a method of spraying a melt solution (melt), in which the above described fine powder of metal oxide or semi-metal oxide is dispersed, by an atomization method (spray method) to form particle powder and, otherwise, (2) a method of cooling the melt solution (melt) in which the above described fine powder of metal oxide or semi-metal oxide is dispersed to produce ingot, and grinding the ingot to obtain a particle powder. Here, as the above described oxide material, it is necessary to select a material existing stably at the above described melting temperature.

Production of metal particles of silicon or tin or alloy particles

In the case where the metal particles are made of silicon, silicon particles can be obtained by grinding silicon ingot with a ball mill such as a planetary ball mill, a vibratory ball mill, a conical mill, and a tube mill; a medium mill such as of an attritor type, a sand grinder type, aniller mill type, tower mill type; an apparatus in which a slurry having a raw material dispersed therein crashes at a high pressure to grind the ingot; and the like. In addition, the fine particle of silicon can be obtained by CVD (Chemical Vapor Deposition) using a silane gas, a method of evaporating silicon in a solvent, or the like. In the case where the metal particles are made of tin, fine particles of tin can be prepared by chemical reduction method with reaction between a tin salt solution and a reduction agent, CVD, or evaporation of metal tin.

In the case where the alloy particles are alloy particles of silicon or tin or an alloy thereof and at least an transition metal element, the alloy particles are formed by an atomization method (spray method) such as a method of mixing silicon or tin or both of silicon and tin with a transition metal and the like, melting the mixture under an inert gas or under vacuum to form melt, and thereafter, atomizing the melt with an inert gas to form a powder (so-called gas atomization method), a method of spaying particles to a rotating disk to form powder, a method of spraying particles with high pressure water (so-called water atomization method). Application of ultrasonic wave at the time of spaying the melt can further enhance uniformity in the element composition of the alloy particles obtained by spaying. By increasing a cooling rate in the above described atomization method, the amorphous state of the particles further progresses. Moreover, the powder obtained by the above described atomization method is treated with a mill such as a ball mill to perform further fine grinding and progress of the amorphous state of the powder.

In addition, after the material to become a raw material is mixed and melted to form a melt, alloy powder can be obtained by further grinding powder or ribbon obtained at a high cooling rate in a gun method, a single roll method or a double roll method. Of course, the obtained powder can be made further amorphous by a treatment with a ball mill or the like.

For the treatment with a ball mill or the like, treatment by adding graphite, alcohol and the like to the alloy powder can restrain reaction of fine powder to oxygen after treatment. Carbon material such as graphite and the like is hard and poor in spread property and extension property and therefore is hardly apt to adhere. Thus, addition of the carbon material such as graphite and the like is effective in prevention of adhesion of the material to a grinding container and is effective in increase of a yield. In addition, carbon material is stable and is hardly apt to be oxidized and, therefore, can coat the surface of the finely ground negative material particles to restrain oxidization thereof. Treatment by addition of alcohol can restrain oxidization of the material to be treated.

As a method of obtaining the fine particles of the alloy, there is a method of obtaining fine powder by mixing Laves phase intermetal compound of C-15 type such as $CeNi_2$, $CeFe_2$, $YNi_2$, $YFe_2$, $DyNi_2$ and $DyFe_2$ as representative examples with the above described alloy raw material, or adding raw materials of composition for forming Laves phase intermetal compound of C-15 type or the like to the above described alloy raw material, melting the mixture, producing an ingot or an atomized powder, and thereafter performing hydrogen occlusion into the ingot or powder to trigger volume expansion due to hydrogen occlusion, thereby causing formation of fine powder and amorphous state.

In addition, another fine powder of the alloy can be obtained by direct mechanical alloying in which the alloy raw materials are mixed with a mill such as a planetary ball mil, a vibratory ball mill, an attritor, or like.

(Method of Producing Composite Powder Material)

The first method of producing the composite is a method of producing particles including a plurality of fine regions of a metal of silicon or tin or an alloy thereof and including metal oxide or semi-metal oxide arranged on an interface between the fine regions. More specifically, by mixing a metal of silicon or tin in a particle or powder state or an alloy powder with a metal oxide material or a semi-metal oxide material and thereafter carrying out grinding (mechanochemical or mechanical milling and mechanical alloying) treatment, it is possible to obtain the powder material of the present invention including a plurality of fine regions of a metal of silicon or tin or an alloy thereof and a metal oxide phase or a semi-metal oxide phase present in a grain boundary of an interface between the fine regions, which is aggregate of particles having the structure of FIG. 1 and FIG. 2. Since metal oxide and semi-metal oxide are generally high in hardness, the grinding treatment of the mixture including metal oxide material or semi-metal oxide material has an effect of finely grinding silicon or tin or an alloy thereof, making crystalline particles smaller, and progressing the amorphous state of the particles. In addition, formation of composite particles of metal oxide or semi-metal oxide has an effect of making silicon or tin or an alloy thereof amorphous, and decreasing the rate of volume expansion caused at the time of lithium insertion.

The above described metal oxide and semi-metal oxide can include one or more kinds of oxides selected from oxides including element selected from the group consisting of Mo, W, Nb, Ta, V, B, Ti, Ce, Al, Ba, Zr, Sr, Th, Mg, Be, La, Ca and Y as main component having smaller Gibbs free energy than that in the case of oxidizing silicon or tin or an alloy including at least one of silicon and tin; or an composite oxide thereof. Moreover, they preferably includes one or more kinds of oxides selected from oxides including an element selected from the group consisting of B, Ti, Ce, Al, Ba, Zr, Sr, Th, Mg, Be, La, Ca and Y as a main component which are thermodynamically stable; and a composite oxide thereof.

The oxide can be material having ionic conductivity. The desirable materials include $WO_2$, $TiO_2$, $MoO_2$, $Nb_2O_5$, $MoO_3$, $WO_3$, $Li_4Ti_5O_{12}$, $Li_2Nb_2O_5$, $LiNbO_3$, $LiWO_2$, $LiMoO_2$, $LiTi_2O_4$, $Li_2Ti_2O_4$, $H_2Ti_{12}O_{25}$, $Na_2Ti_{12}O_{25}$, $VO_2$, $V_6O_{13}$, $Al_2O_3$, $Al_2O_3.Na_2O$, MgO, $ZrO_2$ and $La_2O_3$; oxides having the ratio of the above described element to oxygen element which is a nonstoichiometric proportion; and oxides in which a part of W, Ti, Mo, Nb, V, Al, Mg, Zr and La of these oxides is replaced with another metal element or semi-metal oxide and which include an element selected from W, Ti, Mo, Nb, V, Al, Mg, Zr and La as a main component.

The metal oxide or semi-metal oxide having a desired high hardness can include, specifically, alumina $Al_2O_3$, beryllia BeO, magnesia MgO, thoria $ThO_2$, titania $TiO_2$, spinel $MgO.Al_2O_3$, zirconia $ZrO_2$ having a Mohs hardness of 5.5 or more.

The second method can be adapted in which the particles of powder material of the present invention having a structure as shown in FIG. 1 or FIG. 2 is also produced by mixing metal particles of silicon or tin or an alloy thereof or raw material powder thereof with metal oxide material or semi-metal oxide material or lithium-metal composite oxide material, and grinding the mixture with a mill such as a planetary mill, a vibratory ball mill and an attritor to perform fine grinding, alloy formation and formation of the composite at the same time. At the time of formation of the composite particles, formation of the metal or the alloy into an amorphous state is concurrently progressed. In particular, the mixing and grinding of the metal oxide or the semi-metal oxide promote formation of powder of the metal or the alloy into an amorphous state.

The third method of forming the composite powder material includes a method of adding and dispersing particles of silicon or tin or an alloy including at least one of silicon and tin to and in a dispersion solution of nanoparticles of metal oxide, semi-metal oxide and metal compound containing at least one kind of element selected from the group containing W, Ti, Mo, Nb, V, Ta, B, Ce, Al, Ba, Zr, Sr, Mg, Th, Be, La, Ca and Y which is dispersed in an organic solution or water, and subsequently evaporating and removing the solvent to dry the mixture, if necessary, followed by heat treatment, to obtain the composite powder material.

In addition, it is possible to obtain particles of powder material of the present invention as shown in FIG. 1 or FIG. 2 by subjecting the particles of metal of silicon or tin or alloy of silicon or tin coated with metal oxide or semi-metal oxide which are obtained by the third method to mechanical milling treatment with a mill such as a planetary mill, a vibratory ball mill, or an attritor.

In the case of adopting the fourth method, the composite powder of the present invention can be obtained by mixing, for example, silicon powder or tin powder, other metal powder to be alloyed, and metal oxide powder or semi-metal oxide powder such as of alumina to be formed into a composite; putting the mixture in a pot made of a graphite; deaerating and thereafter replacing the atmosphere with argon gas or the like; heating up to a temperature until the silicon powder or the tin powder or the other metal powder to be alloyed is melted; preparing a melt in which metal oxide powder or semi-metal oxide to be formed into composite particles is dispersed; thereafter, cooling to fabricate ingot and grinding it, or spraying to cool the melt.

Production of nanoparticles to become raw material of metal oxide or semi-metal oxide for forming composite In the present invention, as metal oxide or semi-metal oxide used in the second coating layer formed into a composite state, transition metal oxide, magnesium oxide, and aluminum oxide can be preferably used, and both of these metal oxides containing lithium and these metal oxides containing no lithium can be used. The examples of a method of producing nanoparticles of metal compound for forming the coating layer include:

(1) a forming method utilizing hydrolysis (so-called sol-gel method) of metal alkoxide, complex such as acetyl acetone of metal, or metal halide; a method of reacting acetate salt of metal or alkoxide of metal with hydrogen peroxide solution; and a method by heat decomposition of a metal compound;

(2) a method of mixing metal oxide with a salt of alkali metal such as cesium and potassium and scintillating the mixture to prepare layered alkali metal-metal oxide, treating it with an acid to replace alkali metal thereof with proton, thereafter dipping the product into solution of quaternary ammonium salt to exchange the proton with quaternary ammonium cation to insert quaternary ammonium cation between the layers, and peeling the layers to prepare a nanosheet;

(3) a method of hydrolyzing alkoxide of metal, complex such as acetyls acetone of metal, and reacting alkali such as sodium hydrate and lithium hydrate in an autoclave to prepare a metal oxide nanotube;

(4) a method of forming peroxide polyacid solution of transition metal by reacting metal or metal carbonate with hydrogen peroxide solution; and (5) A method of allowing an alkali metal-metal oxide solution to pass a cation exchange resin layer to obtain a metal oxide gel solution.

By addition of an amphiphilic surface-active agent such as alkyl phosphate and use of the surface-active agent as a template at the time of forming the nanoparticles by the sol-gel method, it is possible to obtain porous metal oxide particles including small pores with regularity such as mesoporous which contribute to energy storage performance.

The metal oxide or semi-metal oxide can be oxide including a transition metal element selected from the group consisting of W, Ti, Mo, Nb and V as a main component. The metal oxide or semi-metal oxide can be hydrate. Specific examples thereof include $WO_2$, $TiO_2$, $MoO_2$, $Nb_2O_5$, $MoO_3$, $WO_3$, $Li_4Ti_5O_{12}$, $Li_2Nb_2O_5$, $LiWO_2$, $LiMoO_2$, $LiTi_2O_4$, $Li_2Ti_2O_4$, $VO_2$ and $V_6O_{13}$; oxides having the same element as one of the above oxides, and a ratio of an element selected from the group consisting of W, Ti, Mo, Nb, V, Al, Mg, Zr and La to oxygen element which is a nonstoichiometric proportion; and oxide having the same element as one of the above oxides and including an element selected from the group consisting of W, Ti, Mo, Nb, V, Al, Mg, Zr and La a part of which is replaced with another metal element. In addition, nanoparticles of transition metal compounds (1) to (5) used in the third method may be used as a raw material of metal oxide or semi-metal oxide for composite formation.

A range of weight percentage of the metal oxide or semi-metal oxide to the particles of metal of silicon or tin, or an alloy thereof can fall within the range of 1/99 to 3/7 and more preferably within the range 1/49 to 1/4.

In order to increase the collection rate of a product and in order to decrease the electric resistance of an electrode formed from the obtained composite at the time of forming a composite of the powder of a metal or an alloy and metal oxide or semi-metal oxide, powder of carbon material may be added. The added carbon material is formed into a composite on a surface of the composite powder surface or in a grain boundary of a metal or an alloy. The added amount of the carbon can fall within a range of 0.5 to 30% by weight. As the carbon material, carbon material having graphite structure, amorphous carbon, carbon nanofiber, carbon nanotube and active carbon are used.

Influence of main active material for negative electrode on power density and energy density of energy storage device In the case where the powder material of the present invention is used as the main active material of negative electrode of a energy storage device, the ratio of the metal oxide region or the semi-metal oxide region in the powder material described above to the region of metal of silicon or tin or an alloy largely affects the power density and energy density of a energy storage device. The oxides of transition metal containing transition metal element selected from the group consisting of W, Ti, Mo, Nb and V cannot electrochemically store many lithium ions, but the speed of insertion and release of lithium ions for these oxides is fast and these oxides do not largely change crystal structure due to insertion and release of lithium ions. The metal of silicon and tin and an alloy thereof can electrochemically store a lot of lithium stored, but the speed of insertion and release of lithium ions for the metals and the alloy is not fast and they largely change crystal structure due to insertion and release of lithium ions to take place volume expansion and shrinkage. Therefore in the powder material of the present invention obtained by forming the above described metal oxide or semi-metal oxide into a composite, higher component ratio of metal oxide or semi-metal oxide can form an electrode for an energy storage device apt to take out higher power and suitable to rapid charge and discharge. In addition, increase in the component ratio of metal of silicon or tin or an alloy thereof in the powder material of the present invention can form an electrode capable of charging and discharging larger energy.

(Energy Storage Device)

Figure 4:
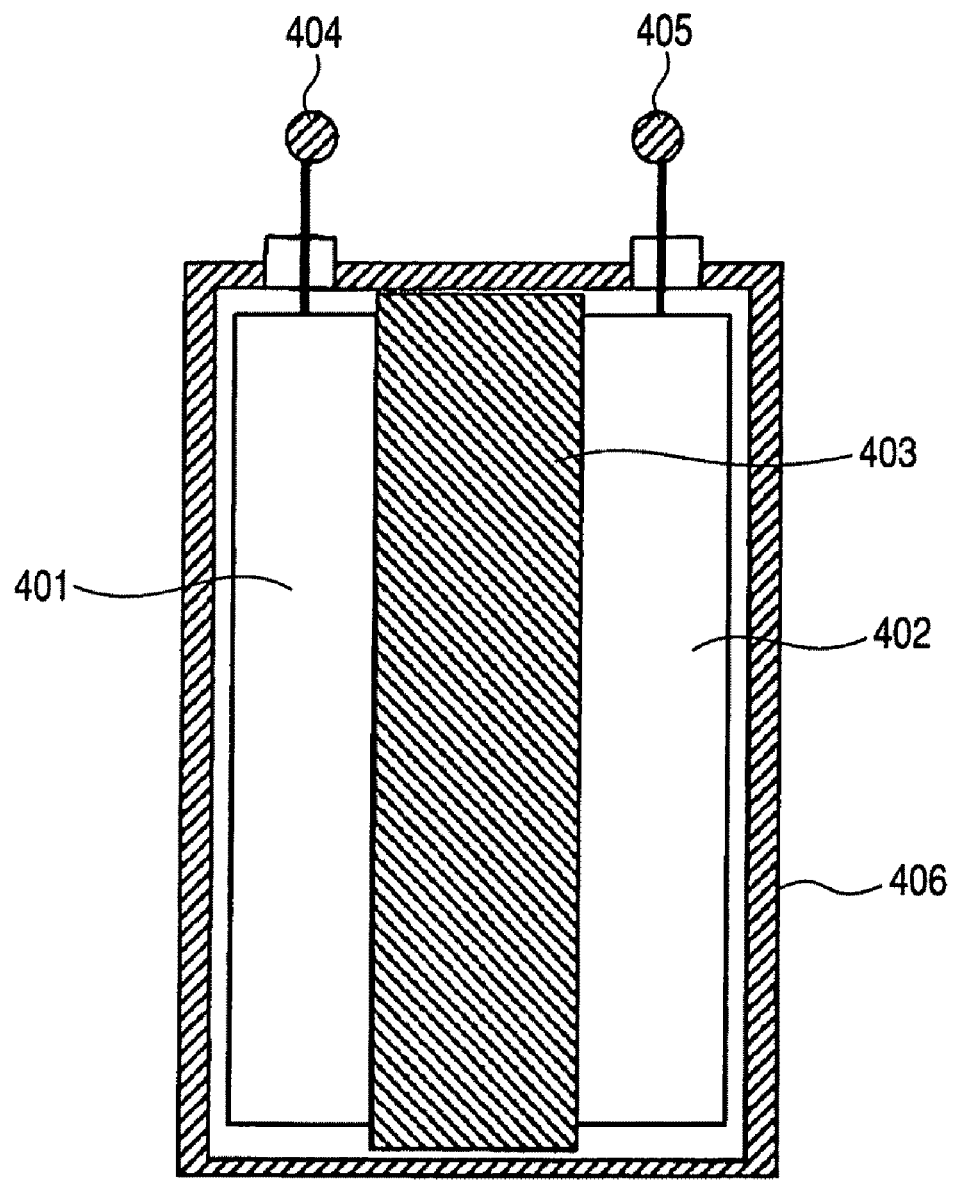
FIG. 4 is a conceptual section of an energy storage device of the present invention.

An energy storage device according to the present invention includes a negative electrode having the powder material of the present invention used as a main active material, ionic conductor (electrolyte) and a positive electrode and is attained by utilizing oxidization reaction of lithium and reduction reaction of lithium ion. The example of an energy storage device according to the present invention includes a secondary battery and a capacitor. FIG. 4 is a diagram illustrating the basic constitution of an energy storage device of the present invention. The energy storage device in FIG. 4 includes a negative electrode 401, ionic conductor 403, a positive electrode 402, a negative electrode terminal 404, a positive electrode terminal 405 and a battery case (housing) 406. For the negative electrode 401, an electrode structure including the powder material of the present invention is used.

(Negative Electrode 401)

The negative electrode used in the energy storage device of the present invention includes a current collector and an electrode material layer (active material layer) provided thereon. The electrode material layer includes the main active material using the powder material of the present invention. The electrode structure for the negative electrode of the present invention includes the main active material 306 of the electrode structure 302 in schematic sectional structure in FIG. 3B, wherein the particle 103 in FIG. 1 or the particle 203 in FIG. 2 are adopted as the main active material. The electrode structure used for the negative electrode is produced through the following procedures.

(1) Conductive auxiliary material powder and binder are mixed to the powder material of the present invention, while appropriately adding a solvent of binder and kneading the mixture to prepare a slurry.

(2) The slurry is applied onto the current collector to form and dry an electrode material to form electrode structure. Moreover, corresponding with necessity, decompression and dry processing is carried out in the range of 100° C. to 300° C. to adjust density and thickness of the electrode material layer with a press machine.

(3) The electrode structure obtained in the above (2) is appropriately cut and adjusted the electrode shape so as to match the electrode structure to the housing of the energy storage device, and the current lead-out electrode tub undergoes is welded as occasion demands, to produce a negative electrode.

For example, coater applying method and screen printing method are applicable as the above described applying method. In addition, without adding a solvent, it is possible to form an electrode material layer by pressing and molding the powder material of the active material, the conductive auxiliary material and the binder on the current collector. Here, the density of the electrode material layer for the negative electrode of the energy storage device of the present invention can fall within the range of 0.5 to 3.0 g/cm$^3$ and can further fall within the range of 0.9 to 2.5 g/cm$^3$. Too large density of the electrode material layer makes expansion of the electrode material layer larger at the time of lithium insertion to cause peeling of the layer from the current collector. In addition, too small density of the electrode material layer makes the resistance of the electrode greater, thereby decreasing the charge/discharge ratio and increasing the voltage drop at the time of discharge of the battery.

[Conductive Auxiliary Material for Negative Electrode]

As a conductive auxiliary material of an electrode material layer (active material layer), it is possible to use amorphous carbon such as acetylene black and ketjen black, carbon material such as graphite structure carbon, carbon nanofiber, carbon nanotube, nickel, copper, silver, titanium, platinum, cobalt, iron, chrome and the like. The carbon material is preferable since it can retain an electrolyte solution and provide a large specific surface area. As the shape of the conductive auxiliary material member, the shape selected from the group consisting of a spherical shape, a flake shape, a filament shape, a fiber shape, a spike shape and a needle shape can be adopted. Moreover, by adopting powder having different two kinds of shapes, increase in packing density at the time of forming an electrode material layer can reduce impedance of the electrode structure. The average size of particle (secondary particle) as the conductive auxiliary material can be 10 µm or less, and preferably 5 µm or less.

[Current Collector for Negative Electrode]

A current collector of the negative electrode of the present invention is in charge of a role to efficiently supply current consumed in electrode reaction at the time of charging and otherwise to collect current generated at the time of discharge. In particular, in the case where the electrode structure is applied to the negative electrode of an energy storage device, a material for forming a current collector is desired to be a material having a high electroconductivity and inactive to electrode reaction of the energy storage device. Preferable material therefore can include one or more kinds of metal materials selected from the group consisting of copper, nickel, iron, stainless steel, titanium, platinum and aluminum. As a more preferable material, inexpensive copper having a low electric resistance can be used. Aluminum foil having an enhanced specific surface area can be used. In addition, the shape of the current collector is a plate-like shape. The "plate-like shape" is not specified in terms of range of utility but includes a mode so called "foil" having a thickness of about 5 µm to about 100 µm. In addition, a plate-like member having a shape selected from the group consisting of, for example, a mesh shape, a sponge shape, a fiber shape, punching metal, a metal having surfaces on both sides where a three-dimensional uneven pattern is formed, expanded metal, and the like can be adopted. The plate-like and foil-like metal on which the three-dimensional uneven pattern is formed can be produced by, for example, pressing a roll made of metal or ceramic and having a surface provided with a micro array pattern or a line and space pattern to transfer the pattern into a plate-like or foil-like metal. In particular, the energy storage device having a current collector including a three-dimension uneven pattern formed thereon gives rise to an advantage of improvement in current property of charge and discharge and improvement in charge/discharge cycle lifetime due to decrease in substantial current density per electrode area at the time of charging and discharging, improvement in adhesiveness of the collector to the electrode layer and improvement in mechanical intensity.

[Binder for Negative Electrode]

The material of a binder for the active material layer of a negative electrode includes organic polymer materials such as fluoroplastic, for example, polytetrafluoroethylene and polyvinylidene-fluoride, polyamideimide, polyimide, polyimide precursor (polyamic acid prior to polyimidization or by incomplete polyimidization), styrene-butadiene rubber, modified polyvinyl alcohol-based resin with reduced water absorption property, polyacrylate-based resin, polyacrylate-based resin-carboxymethyl cellulose, and the like. In the case where polyimide precursor (polyamic acid prior to polyimidization or by incomplete polyimidization) is used, polyimidization may be performed by carrying out heat treating within a range of 150° C. to 300° C. after application of the electrode layer.

For maintaining the binding of the active material during charge/discharge cycle and activating performance of the negative electrode storing a larger electric amount, the content amount of the binder in the electrode material layer can be 2 to 20% by weight and preferably 5 to 10% by weight. In the case where component ratio of metal oxide or semi-metal oxide in the main active material of the negative electrode is large, fluoroplastic such as polytetrafluoroethylene and polyfluorovinylidine-difluoride and polymer material such as styrene-butadiene rubber and the like, which can attain small volume expansion of the negative electrode layer at the time of charging, a low ratio of active material surface to be coated with a binder and a large surface area effective for a reaction can be used as the binder. In the case where the component ratio of metal of silicon or tin or an alloy thereof in the main active material of the negative electrode is large, the volume expansion at the time of charging becomes large. Therefore, a binder having a strong adhesive force is preferable. The binder in that case is preferably polyamideimide, polyimide, polyimide precursor, modified polyvinyl alcohol-based resin, polyvinylidene fluoride or the like.

(Positive Electrode 402)

A positive electrode 402 to become a counter electrode of the energy storage device to the negative electrode including the main active material of the present invention is generally divided into the following three cases:

(1) in the case where a high power density is desired, activated carbon, mesoporous carbon (carbon having pores of a meso region mainly developed therein), carbon nanofiber (carbon fiber in a nanometer order), carbon nanotube, carbon material having a high specific surface area and/or porosity such as graphite having an increased specific surface area by grinding treatment and the like, and metal oxide or semi-metal oxide having high specific surface area are used as the active material of the positive electrode. In that case, it is necessary to store lithium in the negative electrode in advance. As a method thereof, there is a method of causing lithium metal to contact the negative electrode to cause a short circuit to introduce lithium or introducing lithium into the main active material as lithium-metal oxide or lithium-semi-metal oxide in advance.

(2) Although inferior to the positive electrode of the above (1) in power density, in order to further enhance energy density, crystalline lithium-transition metal oxide or lithium-transition metal phosphate compound having a comparatively flat potential at the time of discharging is used as the main active material of the positive electrode. The transition metal element contained in the positive electrode active material can include Ni, Co, Mn, Fe and Cr as a main element.

(3) In the case where increase in the power density is desired compared with the positive electrode of the above (2), amorphous transition metal oxide, transition metal phosphate compound, lithium-transition metal oxide, or lithium-transition metal phosphate compound is used for the active material of the positive electrode. The crystallite size of the positive electrode material can be 100 nm or less and preferably 50 nm or less. An element selected from the group consisting of Mn, Co, Ni, Fe and Cr is suitably used as a transition metal element of the main element of the positive electrode material. The active material of the positive electrode is made amorphous and therefore the particle diameter is small and the specific surface area is large. Accordingly, not only intercalation reaction of lithium ions but also adsorption reaction of the surface of ions can be utilized. Therefore it is guessed that the present positive electrode is enhanced compared with the positive electrode of the above (2). The positive electrode active material can be formed with oxide or composite oxide including an element selected from the group consisting of Mo, W, Nb, Ta, V, B, Ti, Ce, Al, Ba, Zr, Sr, Th, Mg, Be, La, Ca and Y as a main component into a composite. Likewise the case of the negative electrode active material, formation of the positive electrode active material and the oxide into a composite can be made the crystal particles small to promote amorphization the particles. In addition thereto, in order to enhance electronic conductivity of the positive electrode active material, carbon materials such as amorphous carbon, carbon nanofiber (carbon fiber in a nanometer order), carbon nanotube, graphite powder and the like can be formed with the positive electrode active material into a composite.

In addition, the positive electrode active material is made porous, whereby the power density can be enhanced further. Moreover, the material of the above (1) may be formed into a composite. In the case where lithium allowing deintercalation is contained in the main active material of the positive electrode, likewise the above (1), it is necessary to store lithium in the negative electrode in advance. In addition, it is also possible to form a polymer such as a conductive polymer capable of storing ions electrochemically with the positive electrode active materials of the above (1), (2) and (3) into a composite.

(Positive Electrode Active Material)

An example of carbon with high specific surface area and/or porosity used for a positive electrode of the above (1) includes a carbon material obtained by carbonizing an organic polymer in an inert gas atmosphere, and a carbon material obtained by treating the carbon material with alkali and the like to form small pores on the carbon material. In addition, it is possible to use, as the positive electrode active material, mesoporous carbon obtained by intercalating an organic polymer material into a mold of such as of oxide having orientated small pores produced under a presence of an amphiphilic surface-active agent and carbonizing it, and carrying out etching to remove the metal oxide. The specific surface area of the carbon material can fall within the range of 1000 to 3000 m$^2$/g. Besides the carbon material, transition metal oxide such as manganese oxide having a high specific surface area can be used as well.

As crystalline lithium-transition metal oxide or lithium-transition metal phosphate compound used for the positive electrode active material of the above (2), oxide or phosphate compound of Co, Ni, Mn, Fe, Cr and the like as a transition metal element useful for a lithium secondary battery can be used. The above compounds can be obtained by mixing lithium salt or lithium hydroxide and a transition metal salt at a predetermined ratio (in the case of preparing a phosphate compound, phosphoric acid and the like is added), and reacting the mixture at a high temperature of 700° C. or more. In addition, with technique such as sol-gel method and the like, fine powder of the positive electrode material can be obtained.

As the positive electrode active material of the above (3), amorphous lithium-transition metal oxide, lithium-transition metal phosphate compound, transition metal oxide and transition metal phosphate compound are used in which a transition metal element is Co, Ni, Mn, Fe, Cr, V and the like. The amorphous transition metal oxide or transition metal phosphate compound is obtained by making crystalline, lithium-transition metal oxide, lithium-transition metal phosphate compound, transition metal oxide or phosphate compound amorphous by mechanical milling using a planetary ball mill, a vibratory mill, attritor or the like. With the mill, a raw material is mixed directly and undergoes mechanical alloying to carry out heat treating appropriately, whereby amorphous lithium-transition metal oxide, lithium-transition metal phosphate compound, transition metal oxide and transition metal phosphate compound can be prepared as well. In addition, these oxides and compounds can be obtained by subjecting oxide or the like obtained by reaction in the sol-gel method from solution of salt, complex or alkoxide as a raw material to heat treatment at a temperature in a range of 100 to 700° C. and more preferably in the range of 150 to 550° C. Heat treatment at a temperature in excess of 700° C. decreases the pore volume of the transition metal oxide to progress crystallization to. Consequently the specific surface area decreases to cause deterioration in performance of charge and discharge characteristic at high current density. The crystallite diameter of the positive electrode active material can be 100 nm or less and can further be 50 nm or less. From a positive electrode active material having such a crystallite diameter, a positive electrode faster in insertion and release of lithium ions and in reaction of adsorption and release of lithium ions is produced.

In addition, the positive electrode active material of the present invention having high energy density and having power density to a certain extent includes: active materials selected from the group consisting of lithium-transition metal oxide, lithium-transition metal phosphate compound, transition metal oxide, and transition metal phosphate compound, in which the transition metal element is Co, Ni, Mn, Fe, Cr, V or the like; and oxide or composite oxide including particles having an amorphous phase and having an element selected from the group consisting of Mo, W, Nb, Ta, V, B, Ti, Ce, Al, Ba, Zr, Sr, Th, Mg, Be, La, Ca and Y as a main component, wherein the active material and the oxide or composite oxide are formed into a composite. The oxide or the composite oxide occupies a range of 1% to 20% by weight and more desirably a range of 2% to 10% by weight of the composite positive electrode active material. When the oxide or the composite oxide for forming a composite is contained exceeding the above weight range, the energy storage capacity of the positive electrode is caused to drop. Contribution of the oxide or the composite oxide to charge and discharge electric amount is desirably 20% or less. The above described positive electrode active material is formed into a composite, whereby the particle size thereof can be made smaller similarly as in the negative electrode of the present invention. Therefore, the utilization rate of the positive electrode active material increases at charging and discharging to cause the electrochemical reaction more uniformly and faster at charging and discharging. Consequently, the energy density and the power density are improved. In addition, the oxide is desirably a lithium ionic conductor such as composite oxide with lithium.

As the above described method of forming a composite, it is also preferable to form the positive electrode material with amorphous carbon, mesoporous carbon (carbon having pores of a meso region mainly developed therein), carbon nanofiber (carbon fiber in a nanometer order), carbon nanotube and carbon material made of graphite having an increased specific surface area by grinding treatment or the like.

Moreover, as the positive electrode active material, two or more kinds of materials selected from the group consisting of materials obtained from the above (1), (2) and (3) may be mixed and used.

Method of Producing Positive Electrode

A positive electrode used in an energy storage device of the present invention is produced by forming an electrode material layer (positive electrode active material layer) on a current collector. As the positive electrode of the present invention, there is used a positive electrode including the above described positive electrode active material in place of the main active material 306 of the electrode structure 302 in schematic sectional structure as shown in FIG. 3B which was used for describing the negative electrode.

The electrode structure used for the positive electrode is produced through the following procedure.

(1) Conductive auxiliary material powder and binder are mixed with the positive electrode active material, while appropriately adding a solvent for binder, and the mixture is kneaded to prepare slurry.

(2) The slurry is applied onto the current collector to form and dry an electrode material layer (active material layer) to form electrode structure. Moreover, as occasion demands, decompression and dry processing is carried out in the range of 100° C. to 300° C. to adjust the density and thickness of the electrode material layer with a press machine.

(3) The electrode structure obtained in the above (2) is cut to adjust the electrode shape so as to match the electrode structure to the housing of the energy storage device, and as occasion demands, the current lead-out electrode tub is welded, to produce a positive electrode.

Coater applying method and screen printing method, for example, are applicable as the applying method. In addition, without adding a solvent, it is possible to form an electrode material layer by pressing and molding the positive electrode active material, the conductive auxiliary material and the binder on the current collector. Here, density of the electrode material layer of the present invention can fall within the range of 0.5 to 3.5 g/cm$^3$ and can further fall within the range of 0.6 to 3.5 g/cm$^3$. For the density range, density of the electrode layer is set low for an electrode for high power density. Density of the electrode layer is set high for an electrode for high energy density.

[Conductive Auxiliary Material for Positive Electrode]

Any material similar to the conductive auxiliary material for the negative electrode may be used.

[Current Collector for Positive Electrode]

Likewise the case of a negative electrode, a current collector of the positive electrode of the present invention is also in charge of a role to efficiently supply current consumed in electrode reaction at the time of charging and otherwise to collect current that occurs at the time of discharge. In particular, in the case where the electrode structure is applied to the negative electrode of an energy storage device, material to form a current collector is desired to be material being high in electrically conductive degree and inactive to reaction of the battery. Material to be nominated can include not less than one kind of metal material selected from the group consisting of aluminum, nickel, iron, stainless steel, titan and platinum. Material can further include inexpensive aluminum with low electric resistance. In addition, the shape of the current collector is plate-like. The "plate-like" will not be specified in terms of range of utility but will include a mode so called "foil" with thickness of around approximately 5 μm to 100 μm. In addition, a plate-like member with a shape selected from the group consisting of, for example, a mesh shape, a sponge shape, a fiber shape, punching metal, metal with both sides where a three-dimensional relief pattern is formed, expanded metal and the like can be adopted. One of plate-like and foil-like metal in which the three-dimensional relief pattern is formed can be produced by, for example, pressing a roll made of one of metal and ceramic including a surface provided with one of a micro array pattern and a line and space patter to cause the plate-like or foil-like metal to undergo transfer. In particular, the energy storage device with a current collector adopted to include a three-dimension relief pattern being formed gives rise to an advantage of improvement in current property of charge and discharge and improvement in charge and discharge cycle lifetime due to decrease in substantial current density per electrode area at the time of charging and discharging, improvement in adhesiveness to the electrode layer and improvement in mechanical intensity.

[Binder for Positive Electrode]

As binder for a positive electrode, the binder for negative electrode can be likewise used. In order to further enlarge effective surface area for reaction of the active material, fluorine resin such as polytetrafluoroethylene and polyfluorovinylidine-difluoride and polymer material such as styrene-butadiene rubber and the like, which are hardly apt to coat the active material surface can be used further. For maintaining binder of active material with repeated charge of discharge to activate performance of the positive electrode storing larger electric amount, the content amount of the binder in the electrode material layer (active material layer) of the positive electrode can be 1 to 20% by weight and can further be 2 to 10% by weight.

(Ionic Conductor 403)

As an ionic conductor of a lithium secondary battery of the present invention, a separator caused to hold electrolyte (electrolyte solution prepared by dissolving electrolyte into a solvent), solid electrolyte, solidified electrolyte obtained by bringing electrolyte solution into a gel state with polymer gel and the like, a composite body of polymer gel and solid electrolyte, lithium ionic conductor such as ionic liquid and the like can be used.

The electrically conductive ratio of the ionic conductor used in a secondary battery of the present invention can be $1 \times 10^{-3}$ S/cm or more and can further be $5 \times 10^{-3}$ S/cm or more as a value at 25° C.

As the electrolyte, there are nominated electrolyte selected from the group consisting of salt including lithium ion ($Li^+$), Lewis acid ion ($BF_4^-$, $PF_6^-$, $AsF_6^-$, $ClO_4^-$, $CF_3SO_3^-$, $BPh_4^-$ (Ph: phenyl group)), mixed salt thereof and ionic liquid. The above described salt is desired to undergo sufficient dewatering and deoxidization by heating in a decompressed state. Moreover, electrolyte prepared by dissolving the above described lithium salt in the melted salt can be used.

Solvent of the electrolyte selected from the group consisting of, for example, acetonitrile, benzonitrile, propylene carbonate, ethylene carbonate, dimethyl carbonate, diethyl carbonate, ethyl methyl carbonate, dimethylformamide, tetrahydrofuran, nitrobenzene, dichloroethane, diethoxyethane, 1,2-dimethoxyethane, chlorobenzene, γ-butyrolactone, dioxolane, sulfolane, nitromethane, dimethyl sulfide, dimethyl sulfoxide, methyl formate, 3-methyl-2-oxazolidinone, 2-methyltetrahydrofuran, 3-propylsydnone, sulfur dioxide, phosphoryl chloride, thionyl chloride, sulfuric chloride or mixed solution thereof can be used.

The solvent undergoes dewatering with, for example, active alumina, molecular sieve, phosphorus pentaoxide, calcium chloride and the like. Otherwise, some solvent can undergo impurity removal and dewatering subjected to distillation under coexistence of alkali metal in an inert gas. Electrolyte concentration of electrolyte solution prepared by dissolving the electrolyte in the solvent can be concentration within a range of 0.5 to 3.0 mol/litter in order to include high ionic conductive level.

In addition, in order to restrain reaction between an electrode and electrolyte solution, it is preferable to add a vinyl monomer, which is apt to induce electropolymerization reaction, to the electrolyte solution. Addition of vinyl monomer to the electrolyte solution forms polymerized coating film including a function of one of SEI (Solid Electrolyte Interface) and passivating film on the active material surface of the electrode to enable extension of charge and discharge cycle lifetime. Too small addition amount of vinyl monomer to the electrolyte solution does not give rise to the effects. Too large addition amount causes ionic conductive degree to decrease to thicken thickness of the polymerized coating film formed at the time of charging to increase resistance of an electrode. Therefore, the addition amount of vinyl monomer to electrolyte solution can fall within a range of 0.5 to 5% by weight.

Specific and preferable examples of the vinyl monomer include styrene, 2-vinylnaphthalene, 2-vinylpyridine, N-vinyl-2-pyrolidone, divinyl ether, ethyl vinyl ether, vinyl phenyl ether, methyl methacrylate, methyl acrylate, acrylonitrile, carbon dioxide vinylene (vinylene carbonate) and the like. More preferable examples include styrene, 2-vinylnaphthalene, 2-vinylpyridine, N-vinyl-2-pyrolidone, divinyl ether, ethyl vinyl ether, vinyl phenyl ether and vinylene carbonate. In the case where the vinyl monomer includes the aromatic group, affinity with lithium ion is intensive and is preferable. Moreover, N-vinyl-2-pyrolidone, divinyl ether, ethyl vinyl ether, vinyl phenyl ether, vinylene carbonate and the like which are high in affinity with solvent of the electrolyte solution can be combined with vinyl monomer including the aromatic group to use combination thereof.

In order to prevent leakage of the electrolyte solution, use of one of solid electrolyte and solidified electrolyte is preferable. The solid electrolyte includes glass of oxide and the like including lithium element, silicon element, oxygen element and phosphor element or sulfur element, polymer complex of organic polymer having ether structure, and the like. The solidified electrolyte can be solidified by bringing the electrolyte solution into a gel state with a gel state establishing agent to get solidified. Porous material with large liquid absorption amount such as polymer and silica gel so as to absorb solvent of electrolyte solution to swell is desirably used as the gel state establishing agent. There is used, as the polymer, polyethylene oxide, polyvinyl alcohol, polyacrylonitrile, polymethyl methacrylate, vinylidene fluoride-hexafluoropropylene copolymer and the like. Moreover, the polymer having cross-linking structure is further preferable.

The separator functioning as a holding member of the electrolyte solution and as ionic conductor is in charge of preventing direct contact and short-circuiting between the negative electrode 401 and the positive electrode 403 inside the energy storage device. The separator needs to include a great number of small pores allowing lithium ions to move and to be insoluble in electrolyte solution and to be stable. Accordingly, there is suitably used, as a separator in one of micropore structure and unwoven fabric structure, film including micronized small pores of material selected from the group consisting of, for example, glass, polyolefin selected from the group consisting of polypropylene, polyethylene and the like, fluorine resin, film with micropores of material selected from the group consisting of fluorine resin, cellulose and the like. In addition, there is usable one of metal oxide film including micropores and resin film obtained by bringing metal oxide into a composite state.

Assembly of Energy Storage Device

The energy storage device is assembled by sandwiching the ionic conductor 403 between the negative electrode 401 and positive electrode 402 in a stacked state to form an electrode group; inserting this electrode group into a battery case 406 under a dry air or dry inert gas atmosphere where a dew-point temperature is sufficiently managed; thereafter connecting respective electrodes to respective electrode terminals and sealing the battery case 406. In the case of using a microporous polymer film holding an electrolyte solution as an ionic conductor, the microporous polymer film as a separator for short-circuit prevention is sandwiched between the negative electrode and the positive electrode to form the electrode group, thereafter the electrode group is inserted the battery case, the respective electrode are connected to the respective electrode terminals, an electrolyte solution is injected into the battery case, and the battery case is sealed to assemble a battery.

As described above, for the energy storage device of the present invention, a composition ratio in powder material of the present invention used as the main active material of the negative electrode is selected, and a plurality of kinds of positive electrode material appropriately are selected. Thereby, discharge voltage as well as battery capacity of the energy storage device of the present invention, power density and energy density can be designed in an optimum manner corresponding to use, thereby obtaining an energy storage device having a high power density and a high energy density.

For use in which high energy density is prioritized, high power density to a certain extent is attained and rapid charge and discharge to a certain extent is required, in the energy storage device of the present invention, the component ratio of metal of silicon or tin or an alloy in the powder material of the present invention used as the main active material of the negative electrode is increased, and lithium-transition metal oxide is adopted as the active material of the positive electrode. Thereby an energy storage device having a high energy density and a little high power density can be provided.

For use in which energy density and power density are required to be high, in the energy storage device of the present invention, the component ratio of metal of silicon or tin or an alloy thereof in the powder material of the present invention used as the main active material of the negative electrode increasing and an amorphous transition metal oxide is adopted as the active material of the positive electrode. Thereby an energy storage device having a high energy density and a less high power density can be provided.

For use in which a high power density and a rapid charging ability are prioritized and a high energy density to a certain extent is required, in the energy storage device of the present invention, the component ratio of metal oxide or semi-metal oxide in the powder material of the present invention used as the main active material of the negative electrode increases, and a carbon materials having a high specific surface area and/or porous structure is adopted as the active material of the positive electrode, whereby an energy storage device having a high power density and having a high energy density to an extent can be provided.

Accordingly, for the energy storage device including electrode structure including powder material of the present invention as the negative electrode, the component proportion of the powder material is selected and a positive electrode including optimum positive electrode active material in conformity with desired characteristics is selected. Thereby, an energy storage device having optimum energy density, optimum power density, optimum charge and discharge characteristic can be produced.

[Shape and Structure of Battery]

A specific cell shape of an energy storage device of the present invention is selected from the group consisting of, for example, a flat shape, a cylindrical shape, a rectangular parallelepiped shape, a sheet shape and the like. In addition, cell structure is selected from the group consisting of a single-layer type, a multilayer type, a spiral type and the like. In those types, a spiral cylindrical cell has a characteristic that the electrode area can be made larger by sandwiching the separator between the negative electrode and the positive electrode to undergo winding and large current is allowed to flow at the time of charging and discharging. In addition, rectangular parallelepiped and sheet-like cells have a characteristic that housing space of an apparatus adapted to house a plurality of batteries can be utilized effectively.

Figure 5:
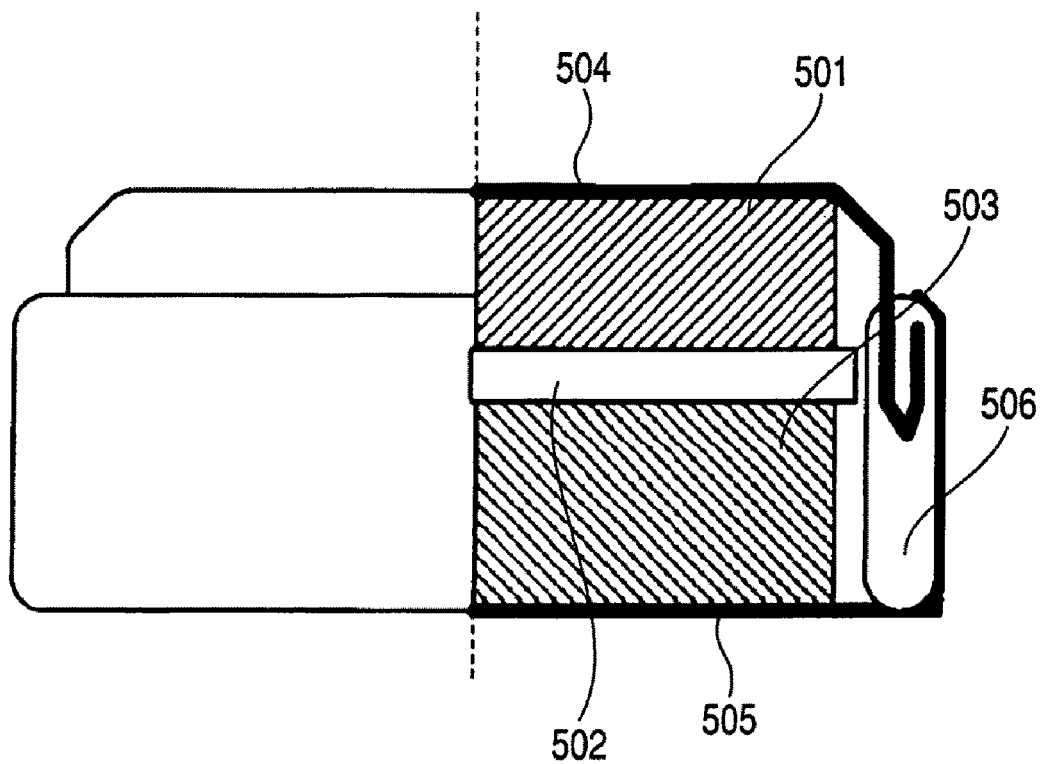
FIG. 5 is a schematic section of a cell of a single-layer flat type (coin type) energy storage device.
Figure 6:
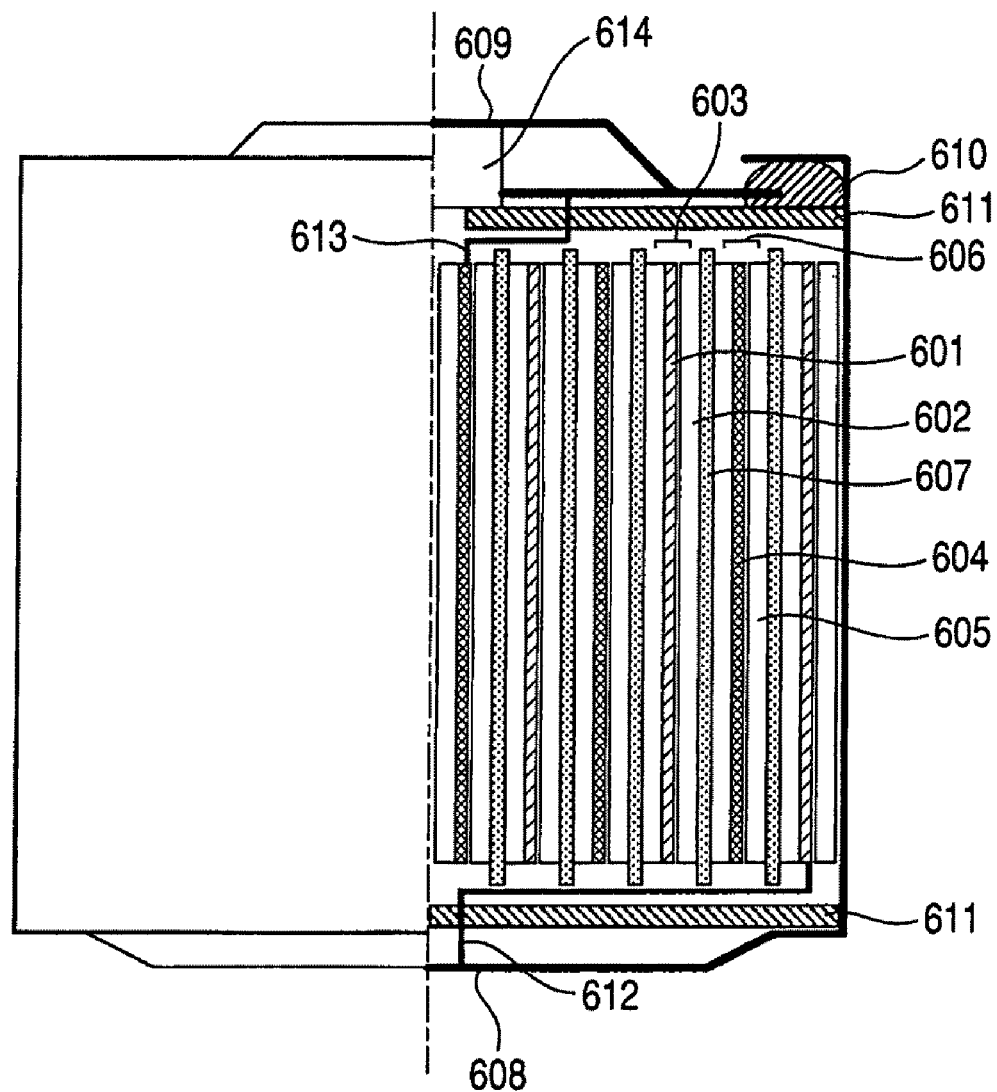
FIG. 6 is a schematic section of a cell of spiral type cylindrical energy storage device.

With reference to FIG. 5 and FIG. 6, cell shape and structure will be described in further detail below. FIG. 5 is a section of a cell of a single-layer flat type (coin type). FIG. 6 is a section of a spiral type cylindrical cell. Energy storage devices with the above shapes have the similar structure to that shown in FIG. 4, and include a negative electrode, a positive electrode, ionic conductor, a battery case (battery housing) and an output terminal.

FIG. 5 and FIG. 6 include negative electrodes 501 and 603, positive electrodes 503 and 606, negative terminals 504 and 608 (one of negative electrode cap and negative electrode can), positive terminals 505 and 609 (one of positive electrode can and positive electrode cap), ionic conductors 502 and 607, gaskets 506 and 610, negative electrode current collector 601, a positive electrode current collector 604, an insulating plate 611, a negative electrode lead 612, a positive electrode lead 613 and a safety valve 614.

In the flat type (coin type) cell illustrated in FIG. 5, the positive electrode 503 including a positive electrode material layer and the negative electrode 501 including a negative electrode material layer are stacked at least through, for example, the ionic conductor 502 formed with a separator holding electrolyte solution. That stacked body is housed inside the positive electrode can 505 from the positive electrode side as the positive terminal and the negative electrode side is covered with the negative electrode cap 504 as the negative terminal. And the gasket 506 is arranged in the other portion inside the positive electrode can.

In the spiral type cylindrical cell illustrated in FIG. 6, the positive electrode 606 including the positive electrode active material layer (the positive electrode (material) layer) 605 formed on the positive electrode current collector 604 is opposite from the negative electrode 603 including the negative electrode active material layer (the electrode layer) 602 formed on the negative electrode current collector 601 at least through, for example, the ionic conductor 607 formed with the separator holding electrolyte solution to form a stacked body in cylindrical structure subjected to winding for a multiple times.

The stacked body with the cylindrical structure is housed inside the negative electrode can 608 as the negative terminal. In addition, the opening portion side of the negative electrode can 608 is provided with the positive electrode cap 609 as the positive terminal. And the gasket 610 is arranged in the other portion inside the negative electrode can. The stacked body of the electrode with the cylindrical structure is set apart from the positive electrode cap side with the insulating plate 611. The positive electrode 606 is connected to the positive electrode cap 609 via the positive electrode lead 613. The negative electrode 603 is connected to the negative electrode can 608 via the positive electrode lead 612. The positive electrode cap side is provided with a safety valve 614 for adjusting the inner pressure inside the battery. The electrode structure of the present invention described above is used for the negative electrode 603.

An example of a method of assembling an energy storage device illustrated in FIG. 5 and FIG. 6 will be described below.

(1) The negative electrode (501, 603) and the molded positive electrode (503, 606) sandwich the separator (502, 607), all of which are incorporated into one of the positive electrode can (505) and negative electrode can (608).

(2) After injection of electrolyte solution, one of the negative electrode cap (504) and the positive electrode cap (609) and the gasket (506, 610) are assembled.

(3) By caulking the assembly obtained in the procedure (2), the energy storage device is completed.

Here, material preparation of the energy storage device and assembly of the cell are preferably carried out in one of dry air subjected to sufficient removal of water and dry inactive gas.

Members to form the energy storage device as described above will be described.

(Gasket)

Material selected from the group consisting of, for example, fluorine resin, polyolefin resin, polyamide resin, polysulfone resin and various kinds of rubber can be used for the gasket (506, 610). As a method of sealing the opening of a cell, a glass seal pipe, adhesive, welding, soldering and the like are used besides "caulking" with a gasket as in FIG. 5 and FIG. 6. In addition, various organic resin material or ceramics is used for the insulating plate (611) in FIG. 6.

(Exterior Can)

An exterior can of a cell is adapted to include one of a positive electrode can and a negative electrode can (505, 608) for a cell and one of a negative electrode cap and a positive electrode cap (504, 609). As material for the exterior can, stainless steel is suitably used. Other materials for the exterior can include aluminum alloy, titanium clad stainless material, copper clad stainless material, nickel plated steel sheet or the like can be also frequently used.

The positive electrode can (605) in FIG. 5 and the negative electrode can (608) in FIG. 6 function as a battery case (cell housing) and a terminal. Therefore the stainless steel is recommendable. However, in the case where one of the positive electrode can and the negative electrode can does not function as a battery case and a terminal, a metal such as zinc in addition to stainless steel and plastic such as polypropylene and composite material of metal or glass fiber and plastic and a film obtained by laminating metal foil of aluminum and the like with plastic film can be used for the battery case.

(Safety Valve)

An energy storage device is provided with a safety valve as a safety measure at an occasion when inner pressure of a cell increases. As a safety valve, for example, rubber, spring, metal ball, burst foil and the like can be used.

EXAMPLES

The present invention will be described in further detail referring to examples.

[Preparation of Active Material for Negative Electrode of Energy Storage Device]

Examples of Procedure of Preparing Powder Material

Reference Example M1

Mixing silicon powder obtained by micronizing metal silicon powder of 96.0% or more purity with medium mill using zirconia beads in isopropyl alcohol to average particle diameter of 0.2 μm, tin powder, copper powder, boron powder, graphite powder of 195:90:15:3:30 in proportion by weight; inserting the mixture into an attritor; implementing 24-hour mechanical alloying treatment at rotation of 300 rpm in argon gas atmosphere; and Si—Sn—Cu—C alloy powder was obtained.

Example M1

Mixing silicon powder obtained by micronizing metal silicon powder of 96.0% or more purity with medium mill using zirconia beads in isopropyl alcohol to average particle diameter of 0.2 μm, tin powder, copper powder, boron powder, graphite powder of 195:90:15:3:30 in proportion by weight; inserting the mixture into an attritor; implementing 24-hour mechanical alloying treatment at rotation of 300 rpm in argon gas atmosphere; and Si—Sn—Cu—B—C (also abbreviated as SiSnCuC) alloy powder with an average diameter of 0.2 μm was obtained. Next, 80 parts by weight of the obtained Si—Sn—Cu—C alloy powder and 20 parts by weight of lithium titanate $Li_4Ti_5O_{12}$ powder with specific surface area being 33.5 m$^2$ were mixed and were ground for 6 hours with a planetary ball mill using zirconia balls to obtain Si—Sn—Cu—B—C alloy-$Li_4Ti_5O_{12}$ composite material powder with an average diameter of 1 μm or less.

The above described obtained composite powder was irradiated with ultrasonic wave in ethanol and dispersed. Dropping the droplets thereof to micro grid coated with carbon film including small pores in copper mesh and drying it, a sample for observation with a scanning electron microscope was produced. With that sample for observation, the composite powder underwent mode observation with SEM (scanning electron microscope apparatus) S5500 produced by Hitachi, Ltd. and underwent composition analysis with EDX (energy dispersive X-ray analyzer) EMAX ENERGY EX450 produced by HORIBA, Ltd. The result thereof (Mapping images of Si, Sn, Cu, Ti and O elements) is illustrated in FIG. 13.

Figure 13:
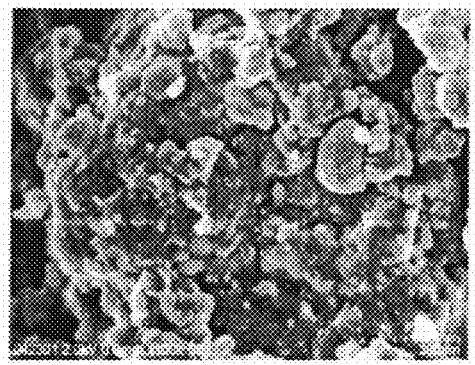
FIG. 13 illustrates an image observed with a scanning transmission electron microscope on Si—Sn—Cu—C alloy powder brought into a composite state with $Li_4Ti_5O_{12}$ in the amount of 20% by weight being an example of the present invention and mapping diagrams of Si, Ti, O, Sn and Cu elements.
Figure 13:
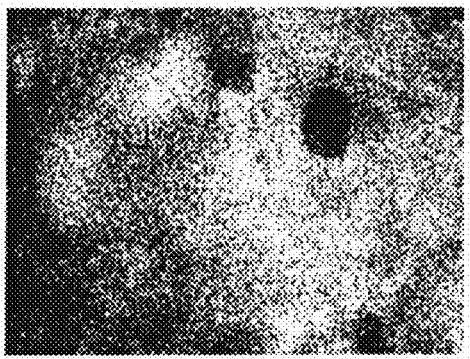
Figure 13:
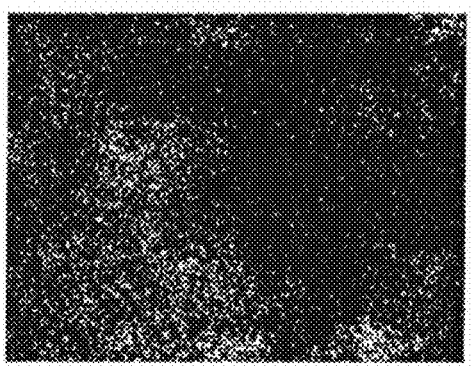
Figure 13:
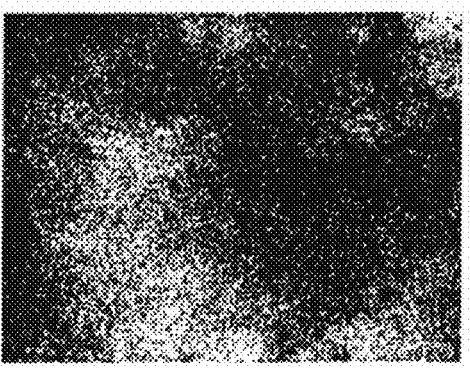
Figure 13:
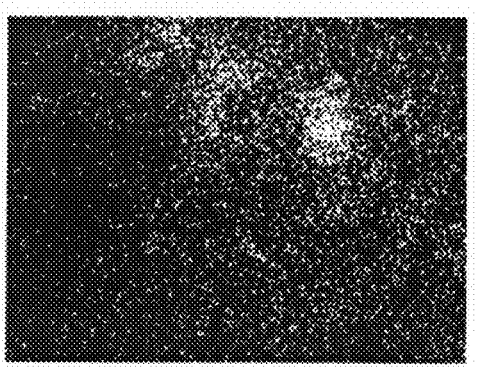
Figure 13:
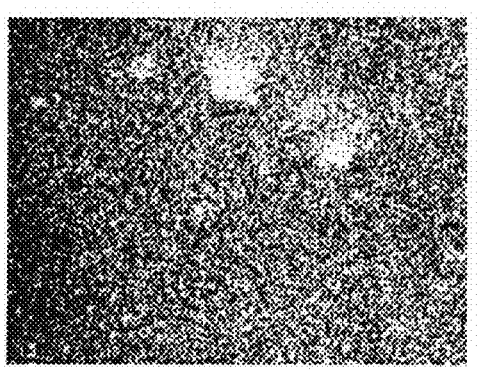

Based on the secondary electronic images in FIG. 13, it was found that the powder material was constituted by aggregate of particles with a size of 200 nm or less. Here, the mapping images of Si, Sn, Cu, Ti and O elements are respectively specified as SiKα1, TiKα1, OKα1, SnLα1 and CuLα1. Particles provided with Ti element distribution corresponding to O element distribution which are brought into observation apparently come into an overlapping state with approximately a half of the Si element distribution. (In another observation spot, some particles were brought into an overlapping state with almost all the surface.) Based thereon, the composite particle powder is deemed to be aggregate of SiSnCuC alloy particles coated by $Li_4Ti_5O_{12}$ on one of a part of surface and the entire surface thereof.

Figure 14:
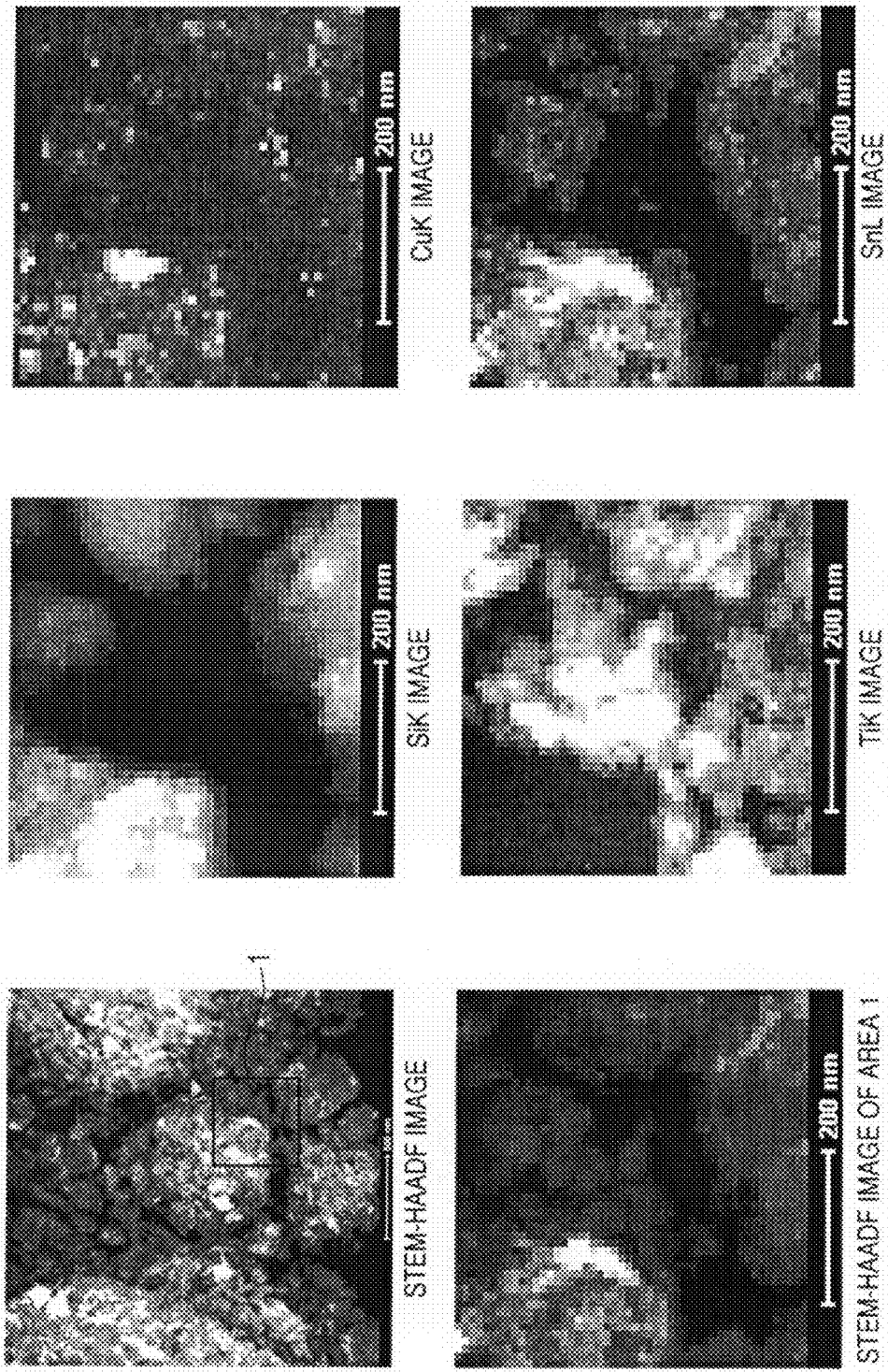
FIG. 14 illustrates images of observed with a scanning transmission electron microscope on laminated Si—Sn—Cu—C alloy powder brought into a composite state with $Li_4Ti_5O_{12}$ in the amount of 20% by weight being an example of the present invention and mapping diagrams of Si, Ti and O elements.

In addition, the composite powder was implanted in epoxy resin and underwent etching treatment with FIB and laminated to produce a sample for observation with a transmission electron microscope. Subsequently, two images (one image being enlarged observation image) observed with a scanning transmission electron microscope (STEM) of Tecnai F30 produced by FEI Company and EDX mapping image are illustrated in FIG. 14. The STEM image deems to have observed a section of the powder sample. SiK, CuK, TiK and SnL in FIG. 14 are respectively mapping images of Si, Cu, Ti and Sn elements. Since those mapping images include Ti element distribution not overlapping on Si element distribution, $Li_4Ti_5O_{12}$ is deemed to coat the SiSnCuC alloy particles.

Based on the results in FIG. 13 and FIG. 14, that is, based on distribution of Ti and O elements, composite powder coating the surface of Si—Sn—Cu alloy powder with $Li_4Ti_5O_{12}$ was apparently formed. In the case where an electrode using the above described composite powder is caused to electrochemically occlude Li rapidly, the coating $Li_4Ti_5O_{12}$ executes a function of restraining dendrites deposition of Li.

In the present example, as the preparing method of composite powder material, after forming alloy powder, metal oxide was brought into a composite state. The source powder of alloy and metal powder can simultaneously undergo alloying and establishing a composite state directly as well. For example, it is possible to produce the composite powder by mixing silicon powder, tin powder, copper powder, boron powder and graphite powder in the proportion by weight of 195:90:15:3:30 to obtain the mixture, adding 20 parts by weight of lithium titanate $Li_4Ti_5O_{12}$ powder to the mixture in the amount of the 80 parts by weight and inserting it to an attritor and carrying out mechanical alloying treatment with rotation of 300 rpm under argon gas atmosphere for 24 hours.

Example M2

Mixing $Li_4Ti_5O_{12}$ powder in the amount of 20 parts by weight into silicon powder in the amount of 80 parts by weight with purity of 99% or more and with average particle diameter of 4 μm, grinding the mixture with a planetary ball mill using zirconia balls at 300 rpm for six hours, an electrode material of Si—$Li_4Ti_5O_{12}$ composite powder with the average particle diameter of 2 μm or less was obtained.

Likewise Example M1, the sample, for observation with a transmission electron microscope, of Si—$Li_4Ti_5O_{12}$ for composite powder was produced. With that observation sample, mode observation and composition analysis were carried out. The analysis result thereof is illustrated in FIG. 12.

Here, the mapping image of Si, Ti and O elements are in the diagrams respectively indicated as SiKα1, TiKα1, OKα1. Based on the mapping images and secondary electronic images of those elements, Ti element distribution and O element distribution nearly overlap and a region of Si element distribution is present in the Ti element distribution and, therefore, $Li_4Ti_5O_{12}$ is deemed to coat the Si particles with the size of 1 μm or less.

Figure 12:
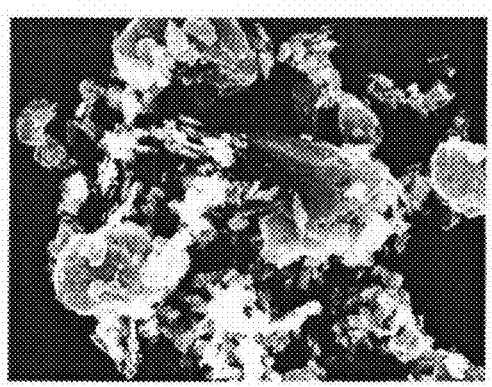
FIG. 12 illustrates an image observed with a scanning transmission electron microscope on Si powder brought into a composite state with $Li_4Ti_5O_{12}$ in the amount of 20% by weight being an example of the present invention and mapping diagrams of Si, Ti and O elements.
Figure 12:
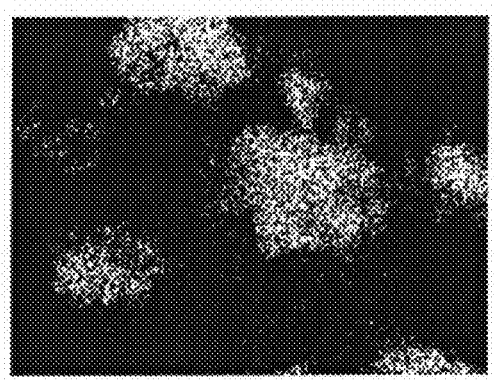
Figure 12:
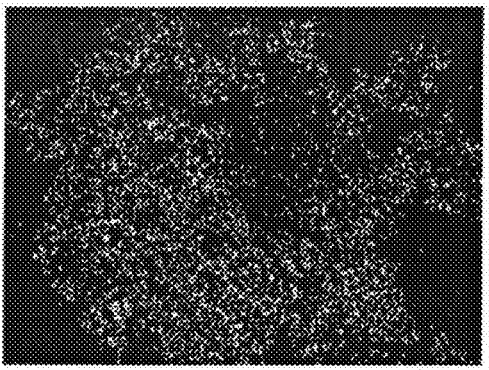
Figure 12:
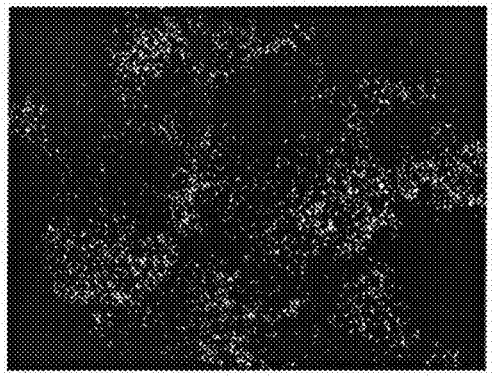

Based on distribution of Ti and O element in FIG. 12, it became apparent that composite powder coating the surface of Si powder with $Li_4Ti_5O_{12}$ was formed.

Example M3

Mixing tungsten dioxide $WO_2$ powder in the amount of 20 parts by weight into silicon powder in the amount of 80 parts by weight with purity of 99% or more and with average particle diameter of 4 μm, grinding the mixture with a planetary ball mill using zirconia balls at 300 rpm for six hours, an electrode material of Si—$WO_2$ composite powder with the average particle diameter of 2 μm or less was obtained.

Example M4

Mixing boehmite AlOOH powder with the average particle diameter of 0.1 μm in the amount of 20 parts by weight into silicon powder in the amount of 80 parts by weight with purity of 99% or more and with average particle diameter of 4 μm, grinding the mixture with a planetary ball mill using zirconia balls at 300 rpm for six hours, an electrode material of Si—AlOOH composite powder with the average particle diameter of 2 μm or less was obtained.

Example M5

Mixing α alumina $Al_2O_3$ powder in the amount of 20 parts by weight with the average particle diameter of 0.3 μm into silicon powder in the amount of 80 parts by weight with purity of 99% or more and with average particle diameter of 4 μm, grinding the mixture with a planetary ball mill using zirconia balls at 300 rpm for six hours, an electrode material of Si—$αAl_2O_3$ composite powder with the average particle diameter of 2 μm or less was obtained.

Example M6

Mixing γ alumina $Al_2O_3$ powder with the average particle diameter of 0.3 μm in the amount of 20 parts by weight into silicon powder in the amount of 80 parts by weight with purity of 99% or more and with average particle diameter of 4 μm, grinding the mixture with a planetary ball mill using zirconia balls at 300 rpm for six hours, an electrode material of Si—$γAl_2O_3$ composite powder with the average particle diameter of 2 μm or less was obtained.

In the above described Example M2 to Example M6, in order to observe the establishment of a composite state with metal oxide, the mechanical milling condition was carried out at a moderate speed. However, in order to prepare active material of an electrode for obtaining a good charge and discharge characteristic, it would be better to adopt a rapid speed condition faster than 300 rpm as the rotation condition of the planetary ball.

So far, examples of establishing a composite state with the mechanical milling processing with the planetary ball mill were presented. However, the planetary ball mill can be replaced by an apparatus such as an attritor.

In addition, a method of establishing a composite state is applicable to methods other than the mechanical method. For example, the following preparation of composite is also adoptable.

Grinding metal silicon powder with a medium mill of zirconia beads in isopropyl alcohol up to the average particle diameter of 0.2 μm, silicon micro powder is obtained. Mixing tin powder, copper powder, boron powder and graphite powder with the obtained silicon fine powder in the proportion by weight of Si:Sn:Cu:B:graphite=58.5:32.0:4.5:1.0:3.0; and grinding the mixture with an attritor apparatus in the argon gas atmosphere for 24 hours, Si—Sn—Cu—B alloy fine powder with carbon brought into a composite state is obtained. Subsequently, dispersing the powder in a dispersion solution of $TiO_2$ in nanosheet structure and/or $TiO_2$ in nanotube structure, and thereafter evaporating and drying the solvent, heat treating at 150° C. is carried out to obtain Si—Sn—Cu—B—C alloy powder coated by $TiO_2$.

Comparative Example M1

Grinding silicon powder in the amount of 100 parts by weight with an average particle diameter of 4 μm with a planetary ball mill using zirconia balls at 300 rpm for six hours, an electrode material of Si powder with an average particle diameter of 2 μm or less was obtained.

The powder X-ray diffraction analysis with CuKα-ray was carried out on the above Examples M1, M2, M5 and M3 and silicon powder with purity of 99% or more and with the average particle diameter of 4 μm not yet undergoing treatment in a range of diffraction angle of 2θ of 20° to 70°. Diffraction chart on the analysis result is illustrated in FIG. 10A to 10E.

FIGS. 10A, 10B, 10C and 10D respectively correspond to X-ray diffraction charts of the powder of the Example M1, the Example M2, the Example M5 and the Example M3. FIG. 10E corresponds to X-ray diffraction chart of the powder of silicon with purity of 99% or more and with the average particle diameter of 4 μm not yet undergoing treatment. Comparing the chart of Si in FIG. 10E with the charts in FIGS. 10B, 10C and 10D, the half-value width of the peaks belonging to Si respectively vary more or less but do not change significantly and remain the peaks respectively belonging to $Li_4Ti_5O_{12}$, $\alpha Al_2O_3$ and $WO_2$ being compound material respectively thereof.

Figure 10A:
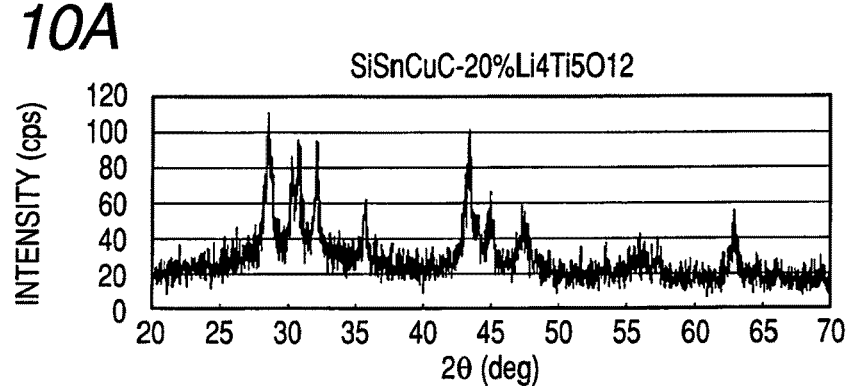
FIGS. 10A, 10B, 10C, and 10D illustrate X-ray diffraction charts of powder material brought into a composite state of the present invention.
Figure 10B:
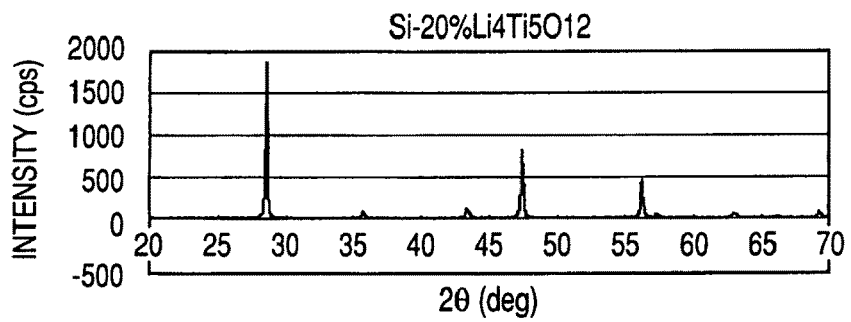
Figure 10C:
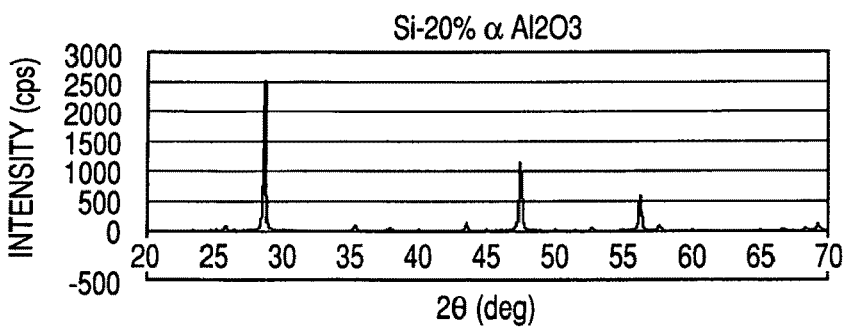
Figure 10D:
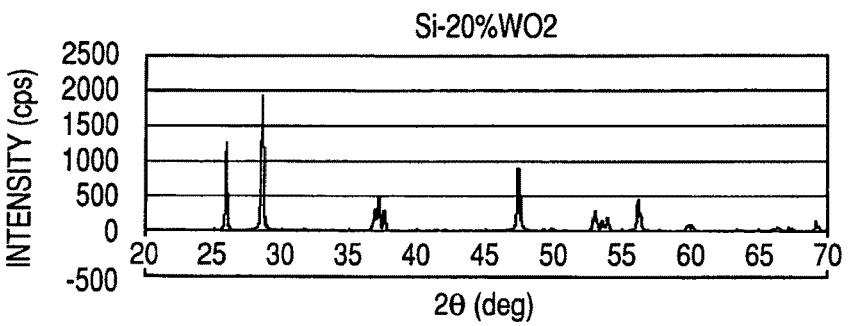
Figure 10E:
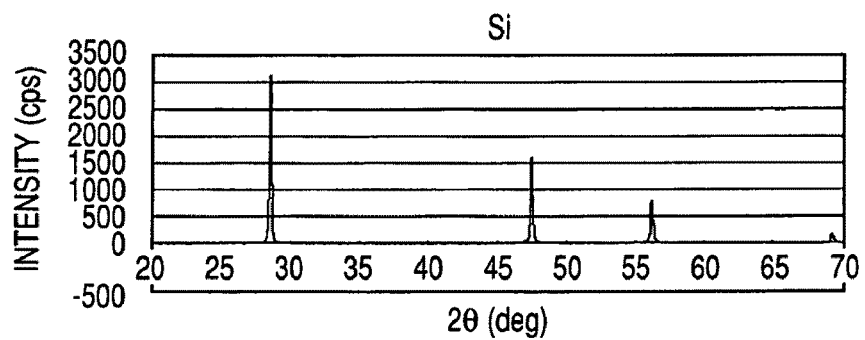
FIG. 10E illustrates an X-ray diffraction chart of Si powder not yet brought into a composite state.

In addition, since SiSnCuC alloy prior to establishment of a composite state underwent amorphization to a considerable extent in FIG. 10A, the peak of $Li_4Ti_5O_{12}$ which was brought into a composite state is hardly confirmed. However, by contrasting the chart in FIG. 10B with the X-ray diffraction chart on SiSnCuC alloy powder having been made amorphous, not illustrated in the drawing, presence of $Li_4Ti_5O_{12}$ can be confirmed.

The crystallite size calculated from the half value width of the peaks in the X-ray diffraction charts of FIGS. 10B to 10E turns to decrease slightly and to get noncrystallized a little due to the establishment of a composite state on metal oxide. For the sake of reference, the crystal size calculated with Scherrer's equation based on the half value width of the peak in the vicinity of the 2θ=28.5° was 64 nm for untreated Si with the average particle diameter of 4 μm. In contrast, the crystallite size was 60 nm for Si with $Li_4Ti_5O_{12}$ brought into a composite state in Example M2, 63 nm for Si brought into a composite state with $WO_2$ in Example M3 and 60 nm for Si brought into a composite state with $\alpha Al_2O_3$ in Example M5. On the other hand, the crystallite size of SiSnCuC alloy with $Li_4Ti_5O_{12}$ brought into a composite state in Example M1 was 20 nm.

Increase in the rotation of the planetary ball mill in the above described conditions for establishing a composite state and extension of treating further promote amorphization.

[Fabrication of Electrode Structure for Negative Electrode of Energy Storage Device]

Reference Example e1

The composite powder in the amount of 104 parts by weight prepared in the above described Example m1 and carbon nanofiber in the amount of 1 part by weight with fiber diameter of 150 nm and the fiber length of 8 μm were mixed at 300 rpm with a planetary ball mill apparatus using balls made of agate for 30 minutes. Subsequently, into that mixture, graphite powder in the amount of 70 parts by weight with the average particle diameter of 4 μm and acetylene black in the amount of 2 parts by weight were added and mixed at 300 rpm with the planetary ball mill apparatus for 10 minutes. Moreover, adding N-methyl-2-pyrrolidone solution in the amount of 132 parts by weight containing polyamideimide in the amount of 15% by weight and N-methyl-2-pyrrolidone in the amount of 130 parts by weight into the obtained mixture, and mixing the mixture with the planetary ball mill apparatus at 300 rpm for 10 minutes, slurry for forming an electrode active material layer was prepared.

Applying the obtained slurry onto copper foil with thickness of 10 μm with an applicator, thereafter drying it at 110° C. for an hour, and moreover drying it under decompression at 150° C., electrode structure in which an electrode active material layer with thickness of 13 μm and density of 1.64 g/cm³ was formed on a current collector of copper foil was obtained.

Example E1

In the Reference Example e1, the powder material Example m1 was replaced by the powder material Example M1 and likewise the Reference Example e1, electrode structure in which an electrode active material layer with thickness of 18 μm and density of 1.77 g/cm³ was formed was obtained.

Further, after viscosity of the slurry obtained above is adjusted, high voltage is applied between a copper foil as a current collector and a nozzle of electrospinning apparatus, whereby an electrode active material layer can be formed on the copper foil.

Example E2

Into the composite powder in the amount of 98 parts by weight prepared in the above described Example M2, graphite powder in the amount of 70 parts by weight with the average particle diameter of 4 μm and acetylene black in the amount of 2 parts by weight were added and mixed at 300 rpm with the planetary ball mill apparatus using balls made of agate for 10 minutes. Subsequently, adding N-methyl-2-pyrrolidone solution in the amount of 185 parts by weight containing polyvinylidene fluoride in the amount of 10% by weight and N-methyl-2-pyrrolidone in the amount of 157 parts by weight into the obtained mixture, mixing the mixture with the planetary ball mill apparatus at 300 rpm for 10 minutes, slurry for forming an electrode active material layer was prepared.

Applying the obtained slurry onto copper foil with thickness of 10 μm with an applicator, thereafter drying it at 110° C. for an hour, and moreover drying it under decompression at 150° C., electrode structure in which an electrode active material layer with thickness of 19 μm and density of 1.45 g/cm³ was formed on a current collector of copper foil was obtained.

Example E3

In the Example E2, the powder material Example M2 was replaced by the powder material Example M3 and likewise the Example E2, electrode structure in which an electrode active material layer with thickness of 11 μm and density of 1.85 g/cm³ was formed was obtained.

Example E4

In the Example E2, the powder material Example M2 was replaced by the powder material Example M4 and likewise the Example E2, electrode structure in which an electrode active material layer with thickness of 10 μm and density of 1.87 g/cm³ was formed was obtained.

Example E5

In the Example E2, the powder material Example M2 was replaced by the powder material Example M5 and likewise the Example E2, electrode structure in which an electrode active material layer with thickness of 19 μm and density of 1.63 g/cm³ was formed was obtained.

Example E6

In the Example E2, the powder material Example M2 was replaced by the powder material Example M6 and likewise the Example E2, electrode structure in which an electrode active material layer with thickness of 17 μm and density of 1.59 g/cm³ was formed was obtained.

Comparative Example E1

In the Example E2, the powder material Example M2 was replaced by the powder material Comparative Example M1 and likewise the Example E2, electrode structure in which an electrode active material layer with thickness of 15 μm and density of 1.58 g/cm³ was formed was obtained.

Comparative Example E2

In the Example E2, the powder material Example M2 was replaced by untreated silicon powder with purity of 99% or more and with small particle diameter and likewise the Example E2, electrode structure in which an electrode active material layer with thickness of 15 μm and density of 1.72 g/cm³ was formed was obtained.

Here, in the above described Reference Example e1, Examples E1 to E6 and Comparative Examples E1 to E2, in order to evaluate electrochemical performance of the composite powder material of the present invention more accurately, graphite powder with average particle diameter of 4 μm was added more as conductive auxiliary material to form an electrode active material layer.

Comparative Example 3

Carboxymethyl cellulose in the amount of 1 part by weight and styrene-butadiene rubber (in the form of aqueous dispersion of styrene-butadiene rubber) in the amount of 1.5 parts by weight were added into artificial graphite powder in the amount of 100 parts by weight with the average particle diameter of 20 μm and mixed with a planetary ball mill apparatus at 300 rpm for 10 minutes to prepare slurry for forming an electrode active material layer.

Applying the obtained slurry onto copper foil with thickness of 10 μm with a coater, thereafter drying it at 110° C. for an hour, and moreover drying it under decompression at 150° C. Subsequently, the thickness was adjusted by a roll-pressing machine to obtain electrode structure in which an electrode active material layer with thickness of 62 μm and density of 1.67 g/cm³ was formed on a current collector of copper foil.

[Evaluation of Electrochemical Lithium Insertion Amount in Electrode Structure for Negative Electrode of Energy Storage Device]

The evaluation of the electrochemical lithium insertion amount in electrode structure for a negative electrode of the above described energy storage device was carried out in the following procedure.

The electrode structures obtained in the above described Reference Example e1, Examples E1 to E6 and Comparative Examples E1 to E3 were cut at a predetermined size, a nickel ribbon lead was connected to the above described electrodes by spot welding to fabricate the electrodes as a working electrode. Cells including metal lithium assembled as an opposite electrode to the fabricated electrode were fabricated to evaluate the electrochemical lithium insertion amount. The lithium electrodes were fabricated by attaching metal lithium foil with thickness of 140 μm by pressure to copper foil to which the nickel ribbon was connected by spot welding, and having undergone surface roughening on one side.

An evaluation cell was fabricated in the following procedure. That is, under dry atmosphere of a dew point of −50° C. or less, sandwiching polyethylene film in a micro pore structure with thickness of 17 μm and with porosity of 40% as a separator between the respective electrodes fabricated from the above described electrode structures and the above described lithium electrodes; inserting the electrode (working electrode)/separator/lithium electrode (opposite electrode) into a pocket-like battery case made of polyethylene/aluminum foil/aluminum laminate film in nylon structure and delivering electrolyte solution by drops therein; and heating and welding the laminate film in the opening part of the battery case with the lead exposed out of the battery case to fabricate an evaluation cell. Here, for the above described electrolyte solution, the solution obtained by dissolving one M (moll/litter) of lithium hexafluorophosphate (LiPF$_6$) in solvent in the mixture of ethylene carbonate and diethyl carbonate in the volumetric proportion of 3:7 subjected to sufficient water removal was used.

The electrochemical lithium insertion amount was evaluated by discharging the fabricated cell with the lithium electrode as the negative electrode and the fabricated respective working electrodes as the positive electrode until the voltage of the cell reaches zero volt (0 V). That is, the discharged electric amount was taken as the electric amount utilized for inserting lithium.

Lithium insertion amount of each of fabricated electrodes per weight of electrode active material layer of the working electrode and per weight of the main active material prior to establishment of a composite state are compiled in Table 1. Here, the electric amount per weight of the main active material was calculated by subtracting 170 mAh/g as the electric amount per unit weight of the Li$_4$Ti$_5$O$_{12}$ and WO$_2$ of 20% by weight contributing to discharge in the above described discharge region.

TABLE 1

| Example | Working electrode | | | Electrode active material layer (mAh/g) | Main active material (mAh/g) |
|---|---|---|---|---|---|
| | Active material | 20 wt % composite material | Opposite electrode | | |
| Reference Example e1 | SiSnCuC | None | Li | 747 | 1416 |
| Example E1 | SiSnCu | Li$_4$Ti$_5$O$_{12}$ | Li | 714 | 1663 |
| Example E2 | Si | Li$_4$Ti$_5$O$_{12}$ | Li | 1232 | 2932 |
| Example E3 | Si | WO$_2$ | Li | 1268 | 3005 |
| Example E4 | Si | AlOOH | Li | 779 | 1872 |
| Example E5 | Si | αAl$_2$O$_3$ | Li | 1160 | 2785 |
| Example E6 | Si | γAl$_2$O$_3$ | Li | 1036 | 2488 |
| Comparative Example E1 | Milling Si | None | Li | 1341 | 2576 |
| Comparative Example E2 | Untreated Si | None | Li | 1402 | 2694 |
| Comparative Example E3 | Graphite | None | Li | 219 | 224 |

(Here, the electric amount at fifth lithium insertion in Comparative Example E3 was 345 mAh/g per weight of artificial graphite. In addition, in the electrodes of the above described Reference Example e1 and Example E1, the main active material is made amorphous and adhesive polyamideimide was used as binder and, therefore, repeated charge and discharge of the cell result in low decrease in performance. However, in Examples E2 to E6 and Comparative Examples E1 to E2, amorphization of Si as the main active material did not go on much. Polyvinylidene-fluoride with little adhesive strength was used as binder. Therefore, repeated charge and discharge resulted in decrease in charge and discharge amount.)

In the above described Table 1, comparing Reference Example e1 with Example E1, comparing Comparative Example E1 and Comparative Example E2 with Examples E2 to E6, it became apparent that metal oxide brought into a composite state with the main active material enhances efficiency in utilizing the main active material itself and amount of lithium that can be electrochemically accumulated increases. Consequently, it is expected that use of the composite powder material of the present invention in negative electrode material of an energy storage device utilizing oxidization and reduction of lithium can realize an energy storage device with high energy density.

[Preparation of Main Active Material for Positive Electrode of Energy Storage Device]

An example of a method of preparing powder material used in main active material for a positive electrode of an energy storage device will be described below.

Example CM1

Mixing lithium manganate $LiMn_2O_4$ powder in the amount of 90 parts by weight with an average particle diameter of 10 μm with lithium titanate $Li_4Ti_5O_{12}$ powder in the amount 10 parts by weight and with a specific surface area of 33.5 m$^2$/g; and grinding the mixture with a planetary ball mill using zirconia balls at 300 rpm for six hours, an electrode material of $LiMn_2O_4$-$Li_4Ti_5O_{12}$ composite powder was obtained.

Figure 11A:
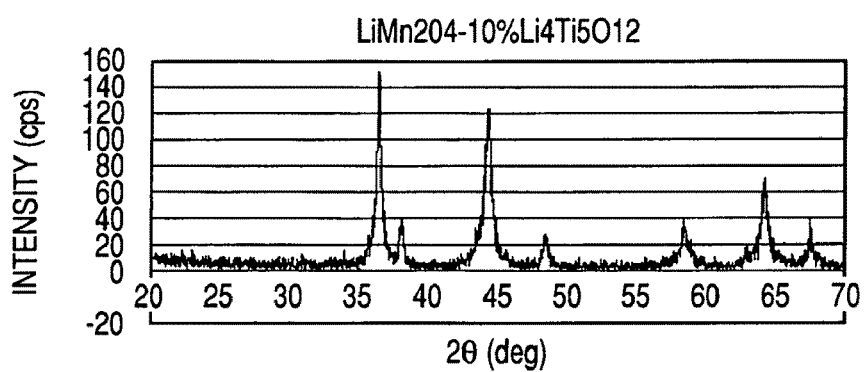
FIG. 11A illustrates an X-ray diffraction chart of Lithium manganate powder brought into a composite state with metal oxide being an example of the present invention.
Figure 11B:
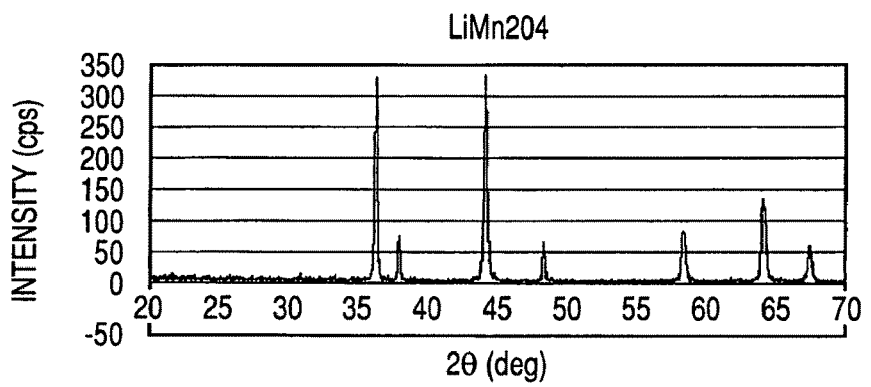
FIG. 11B illustrates an X-ray diffraction chart of Lithium manganate powder.

The powder X-ray diffraction analysis with CuKα-ray was carried out on the obtained composite powder and $LiMn_2O_4$ powder prior to establishment of a composite state in a range of diffraction angle of 2θ of 20° to 70°. Diffraction chart on the analysis result is illustrated in FIGS. 11A and 11B. The crystal size calculated with Scherrer's equation based on the half value width of the peak in the vicinity of the 2θ=44.1° was 25 nm for the $LiMn_2O_4$—$Li_4Ti_5O_{12}$ compound powder and 40 nm for the $LiMn_2O_4$ powder. It became apparent that $LiMn_2O_4$ was made amorphous by establishing a composite state with $Li_4Ti_5O_{12}$.

[Fabrication I of Electrode Structure for Positive Electrode of Energy Storage Device]

An example of a method of preparing electrode structure used for a positive electrode of an energy storage device will be described below.

Example C1

The composite powder in the amount of 150 parts by weight prepared in the above described Example CM1 and carbon nanofiber in the amount of 1 part by weight with fiber diameter of 150 nm and the fiber length of 8 μm were mixed at 300 rpm with a planetary ball mill apparatus using balls made of agate for 10 minutes. Subsequently, into that mixture, graphite powder in the amount of 152 parts by weight with the average particle diameter of 4 μm was added and mixed at 300 rpm with the planetary ball mill apparatus for 10 minutes. Moreover, adding N-methyl-2-pyrrolidone solution in the amount of 150 parts by weight containing polyvinylidene-fluoride in the amount of 10% by weight and N-methyl-2-pyrrolidone in the amount of 140 parts by weight into the obtained mixture and mixing the mixture with the planetary ball mill apparatus at 300 rpm for 10 minutes, slurry for forming an electrode active material layer was prepared.

Applying the obtained slurry onto aluminum foil with thickness of 14 μm with an applicator, thereafter drying it at 110° C. for an hour, and moreover drying it under decompression at 150° C., electrode structure in which an electrode active material layer with thickness of 52 μm and density of 1.87 g/cm$^3$ was formed on a current collector of aluminum foil was obtained.

Further, after viscosity of the slurry obtained above is adjusted, high voltage is applied between a copper foil as a current collector and a nozzle of electrospinning apparatus, whereby an electrode active material layer can be formed on the copper foil.

Comparative Example c1

The lithium manganate $LiMn_2O_4$ powder in the amount of 150 parts by weight with the average particle diameter of 10 μm and carbon nanofiber in the amount of 1 part by weight with fiber diameter of 150 nm and the fiber length of 8 μm were mixed at 300 rpm with a planetary ball mill apparatus using balls made of agate for 10 minutes. Subsequently, into that mixture, graphite powder in the amount of 152 parts by weight with the average particle diameter of 4 μm was added and mixed at 300 rpm with the planetary ball mill apparatus for 10 minutes. Moreover, adding N-methyl-2-pyrrolidone solution in the amount of 150 parts by weight containing polyvinylidene-fluoride in the amount of 10% by weight and N-methyl-2-pyrrolidone in the amount of 140 parts by weight into the obtained mixture and mixing the mixture with the planetary ball mill apparatus at 300 rpm for 10 minutes, slurry for forming an electrode active material layer was prepared.

Applying the obtained slurry onto aluminum foil with thickness of 14 μm with an applicator, thereafter drying it at 110° C. for an hour, and moreover drying it under decompression at 150° C., electrode structure in which an electrode active material layer with thickness of 29 μm and density of 1.88 g/cm$^3$ was formed on a current collector of aluminum foil was obtained.

[Evaluation of Electrochemical Lithium Insertion Amount in Electrode Structure for Positive Electrode of Energy Storage Device]

The evaluation of the electrochemical lithium insertion amount in electrode structure for a positive electrode of the above described energy storage device was carried out in the following procedure.

The electrode structures obtained in the above described Example C1, and Comparative Example c1 were cut at a predetermined size, an aluminum ribbon lead was connected to the above described electrodes with ultrasonic welding to fabricate the electrodes as a working electrode. Cells including metal lithium assembled as an opposite electrode to the fabricated electrodes were fabricated to evaluate the electrochemical lithium insertion amount.

The lithium electrode was fabricated by attaching metal lithium foil with thickness of 140 μm by pressure to copper foil having undergone surface roughening on one side.

An evaluation cell was fabricated in the following procedure. That is, under dry atmosphere of a dew point of −50° C. or less, sandwiching polyethylene film in a micro pore structure with thickness of 17 μm and with porosity of 40% as a separator between the respective electrodes fabricated from the above described electrode structures and the above described lithium electrodes; inserting the electrode (working electrode)/separator/lithium electrode (opposite electrode) into a pocket-like battery case made of polyethylene/aluminum foil/aluminum laminate film in nylon structure and delivering electrolyte solution by drops therein; and heating and welding the laminate film in the opening part of the battery case with the lead exposed out of the battery case to fabricate an evaluation cell. Here, for the above described electrolyte solution, the solution obtained by dissolving one M (moll/litter) of lithium hexafluorophosphate ($LiPF_6$) in solvent in the mixture of ethylene carbonate and diethyl carbonate in the volumetric proportion of 3:7 subjected to sufficient water removal.

The electrochemical lithium insertion amount was evaluated by charging the fabricated cell with the lithium electrode as the negative electrode and the fabricated respective working eletrodes as the positive electrode until the voltage of the cell reaches 4.2 V and discharging the cell until the cell voltage reaches 2.5 V with a current density of 0.48 mA/cm$^2$.

Figure 9A:
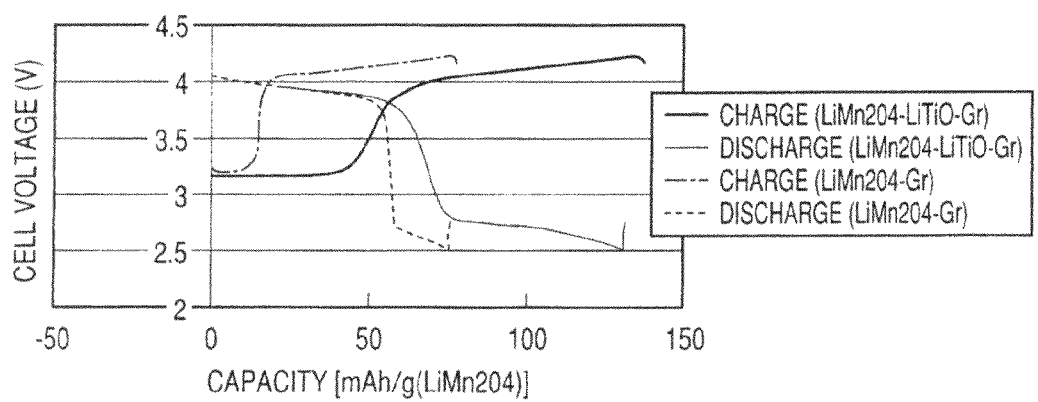
FIG. 9A illustrates charge and discharge curves of cells in combination of positive electrodes respectively including lithium manganate brought into a composite state with metal oxide being an example of the present invention and lithium manganate and a negative electrode of metal lithium.

FIG. 9A is a curve indicating cell voltage to charge and discharge capacity per weight of $LiMn_2O_4$ at the time of charge and discharge of a cell with electrode structure obtained in Example C1 (indicated as LiMn2O4-LiTiO-Gr in the drawing) and with electrode structure obtained in Comparative Example c1 (indicated as LiMn2O4-Gr in the drawing) used as the positive electrode, with lithium metal used as the negative electrode. From those drawings, it became apparent that $LiMn_2O_4$ powder material brought into a composite state with $Li_4Ti_5O_{12}$ in the amount of 10% by weight is higher in utilization rate than $LiMn_2O_4$ powder material not brought into a composite state and the charge and discharge capacity increases. (The cell voltage of 2.5 V or more will affect the charge/discharge capacity little.)

[Evaluation As Energy Storage Device]

Figure 8A:
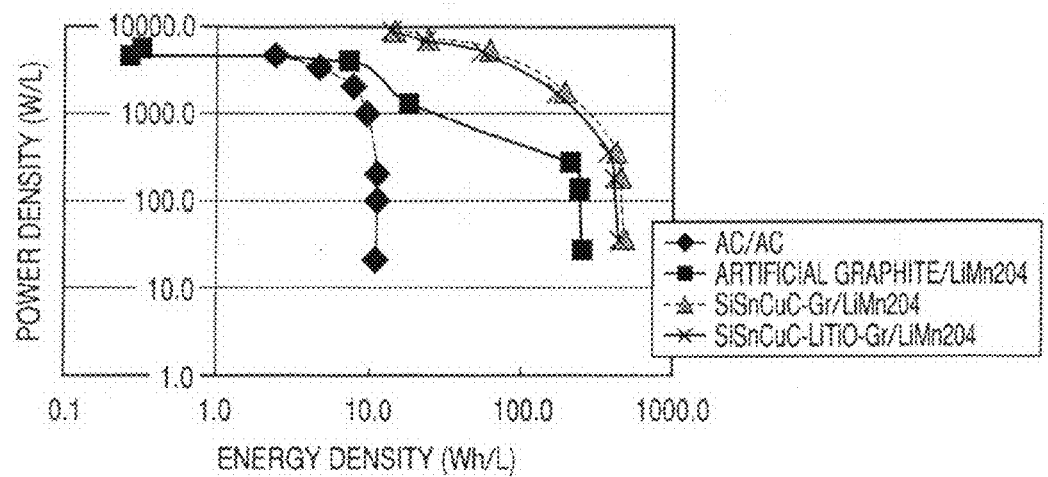
FIG. 8A illustrates power density vs. energy density for a energy storage device in combination of a negative electrode including Si—Sn—Cu—C alloy brought into a composite state with metal oxide being an example of the present invention, Si—Sn—Cu—C alloy and artificial graphite and a positive electrode including lithium manganate and a energy storage device with electrode including activated carbon being used as both of the negative electrode and positive electrode.
Figure 8B:
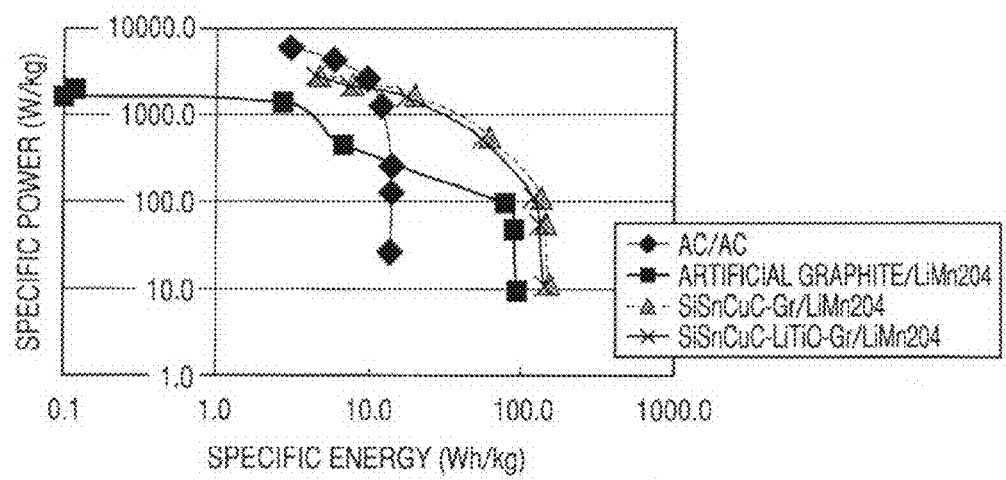
FIG. 8B illustrates specific power vs. specific energy for a energy storage device in combination of a negative electrode including Si—Sn—Cu—C alloy brought into a composite state with metal oxide being an example of the present invention, Si—Sn—Cu—C alloy and artificial graphite and a positive electrode including lithium manganate and a energy storage device with electrode including activated carbon being used as both of the negative electrode and positive electrode.

With electrode structure in the above described Reference Example E1, Example E1 and Comparative Example E3 as a, negative electrode and an electrode formed from $LiMn_2O_4$ as a positive electrode, assembling a cell as mentioned below and measuring discharge energy at respective powers in a range of cell voltage 4.2 V to 2.5 V, so-called Ragone plot was determined. In addition, with electrodes including activated carbon as both of a negative electrode and a positive electrode, assembling a cell and measuring discharge energy at respective powers in a range of cell voltage 2.7 V to 1.3 V, Ragone plot was determined as comparative data of the present invention and evaluation was conducted. (FIGS. 8A and 8B)

Figure 9B:
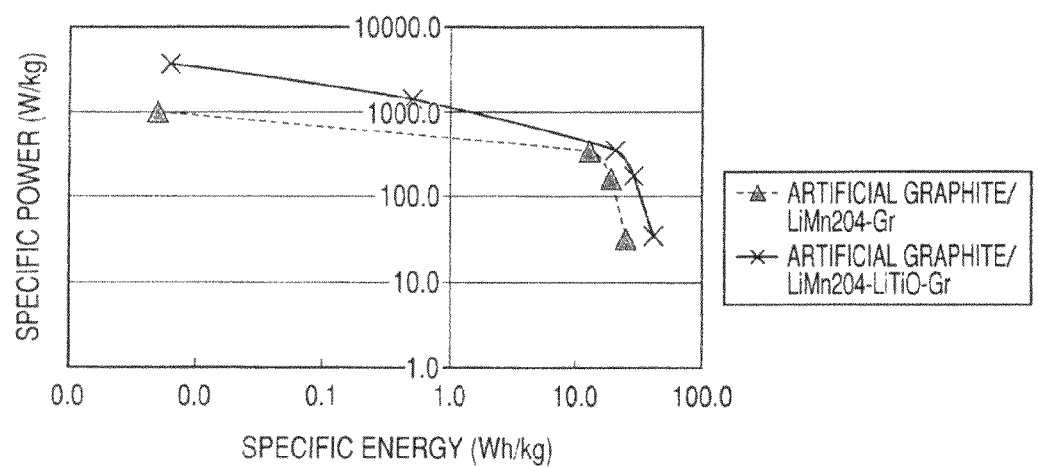
FIG. 9B illustrates specific power vs. specific energy for an electrode active material layer of a cell in combination of positive electrodes respectively including lithium manganate brought into a composite state with metal oxide being an example of the present invention and lithium manganate and a negative electrode including artificial graphite.

In addition, with electrode structure obtained in the above described Example C1 and Comparative Example c1 as a positive electrode and electrode structure in the above described Comparative Example E3 as a negative electrode, assembling a cell and measuring discharge energy at respective powers in a range of cell voltage 4.2 V to 2.5 V, so-called Ragone plot was determined. (FIG. 9B)

(Fabrication of $LiMn_2O_4$ Electrode of Positive Electrode for Energy Storage Device II)

Reference Example C1

Lithium manganate $LiMn_2O_4$ powder in the amount of 100 parts by weight and acetylene black in the amount of 4 parts by weight were mixed at 300 rpm with a planetary ball mill apparatus using agate balls for 10 minutes. Moreover, N-methyl-2-pyrrolidone solution in the amount of 50 parts by weight containing polyvinylidene fluoride in the amount of 10% by weight and N-methyl-2-pyrrolidone in the amount of 50 parts by weight were added to the obtained mixture and mixed at 300 rpm with the planetary ball mill apparatus for 10 minutes to prepare slurry for forming an electrode active layer.

The obtained slurry was applied onto aluminum foil with thickness of 14 μm with a coater and, thereafter, was dried at 110° C. for an hour, and, moreover, was dried under decompression at 150° C. Subsequently, by adjusting thickness thereof with a roll press machine, electrode structure in which an electrode active material layer with thickness of 92 μm and density of 2.82 g/cm$^3$ was formed on a current collector of aluminum foil was obtained.

The obtained electrode structure was cut at a predetermined size and an aluminum ribbon lead was connected to the above described electrode with ultrasonic welding to fabricate the $LiMn_2O_4$ electrode.

(Fabrication of Activated Carbon Electrode for Energy Storage Device)

Reference Example C2

Carboxymethyl cellulose in the amount of 1.7 parts by weight and styrene-butadiene rubber in the amount of 2.7 parts by weight (as aqueous dispersion solution of styrene-butadiene rubber) was added to activated carbon in the amount of 100 parts by weight with specific surface area of 2500 m$^2$/g measured by the BET method and mixed at 300 rpm with the planetary ball mill apparatus for 10 minutes to prepare slurry for forming an electrode active material layer.

The obtained slurry was applied onto an aluminum foil which roughened the surface with thickness of 33 μm with a coater and, thereafter, was dried at 110° C. for an hour, and, moreover, was dried under decompression at 150° C. Subsequently, by adjusting thickness thereof with a roll press machine, electrode structure in which an electrode active material layer with thickness of 95 μm and density of 0.53 g/cm$^3$ was formed on a current collector of copper foil was obtained.

The obtained electrode structure was cut at a predetermined size and an aluminum ribbon lead was connected to the above described electrode with ultrasonic welding to fabricate an activated carbon electrode as a working electrode.

[Example of Preparation Procedure of Energy Storage Device]

Assembly was all conducted under dry atmosphere of a dew point of −50° C. or less with moisture being controlled.

Sandwiching a separator between the negative electrode and the positive electrode prepared above, inserting the electrode group of negative electrode/separator/positive electrode into a pocket-like battery case made of polyethylene/aluminum foil/nylon structure of aluminum laminate film, injecting an electrolyte solution, and taking out electrode lead, and conducting heat sealing, an evaluation cell for regulating positive capacity was produced. The outside of the aluminum laminate film was nylon film and the inside thereof was polyethylene film.

In addition, microporous film of polyethylene, for example, with thickness of 17 μm is used as the separator.

Example of Fabricating Energy Storage Device

Comparative Example D1

By preparing two electrodes made of activated carbon of the Reference Example C2, which are used as both of the negative electrode and positive electrode, an energy storage device was fabricated according to the example of the procedure for fabricating the energy storage device. Here, the electrolyte solution for use was prepared, for example, with the following procedure. At first, by dissolving one M (moll/litter) of tetraethylammonium tetrafluoroborate salt $((C_2H_5)_4NBF_4)$ to propylene carbonate subjected to sufficient water removal, the electrolyte solution was prepared.

Comparative Example D2

By adopting an electrode made of artificial graphite in the comparative Example E3 as the negative electrode and a $LiMn_2O_4$ electrode in the Reference Example C1 as the positive electrode, an energy storage device was fabricated according to the example of the procedure for fabricating the energy storage device. Here, the electrolyte solution for use was prepared, for example, with the following procedure. At first, solvent in the mixture of ethylene carbonate and diethyl carbonate in the volumetric proportion of 3:7 subjected to sufficient water removal was prepared. Subsequently, by dissolving one M (moll/litter) of lithium hexafluorophosphate (LiPF$_6$) in the obtained solvent, the electrolyte solution was prepared.

Reference Example D1

Adopting an electrode made of SiSnCuC alloy in the Reference Example E1 as the negative electrode and the LiMn$_2$O$_4$ electrode in the Reference Example C1 as the positive electrode, an energy storage device was fabricated according to the example of the procedure for fabricating the energy storage device. Here, the electrolyte solution for use was prepared, for example, with the following procedure. At first, solvent in the mixture of ethylene carbonate and diethyl carbonate in the volumetric proportion of 3:7 subjected to sufficient water removal was prepared. Subsequently, by dissolving one M (moll/litter) of lithium hexafluorophosphate (LiPF$_6$) in the obtained solvent, the electrolyte solution was prepared.

Example D1

With the negative electrode made of SiSnCuC alloy with Li$_4$Ti$_5$O$_{12}$ brought into a composite state in the Reference Example E1 and the LiMn$_2$O$_4$ positive electrode in the Reference Example C1, an energy storage device was fabricated according to the example of the procedure for fabricating the energy storage device. Here, the same electrolyte solution as the electrolyte solution in the Reference Example D1 was used.

[Method of Testing Charge and Discharge]

The respective energy storage devices in the above described Comparative Example D2, Reference Example D1 and Example D1 underwent five charge/discharge cycles, each of which includes charging until the cell voltage reaches 4.2 V with a constant current density of 0.48 mA/cm$^2$, thereafter, charging at a constant voltage of 4.2 V and then taking a pause for 10 minutes; and discharging the energy storage devices until the cell voltage reaches 2.5 V with a constant current density of 0.48 mA/cm$^2$ and then taking a pause for 10 minutes.

Figure 7:
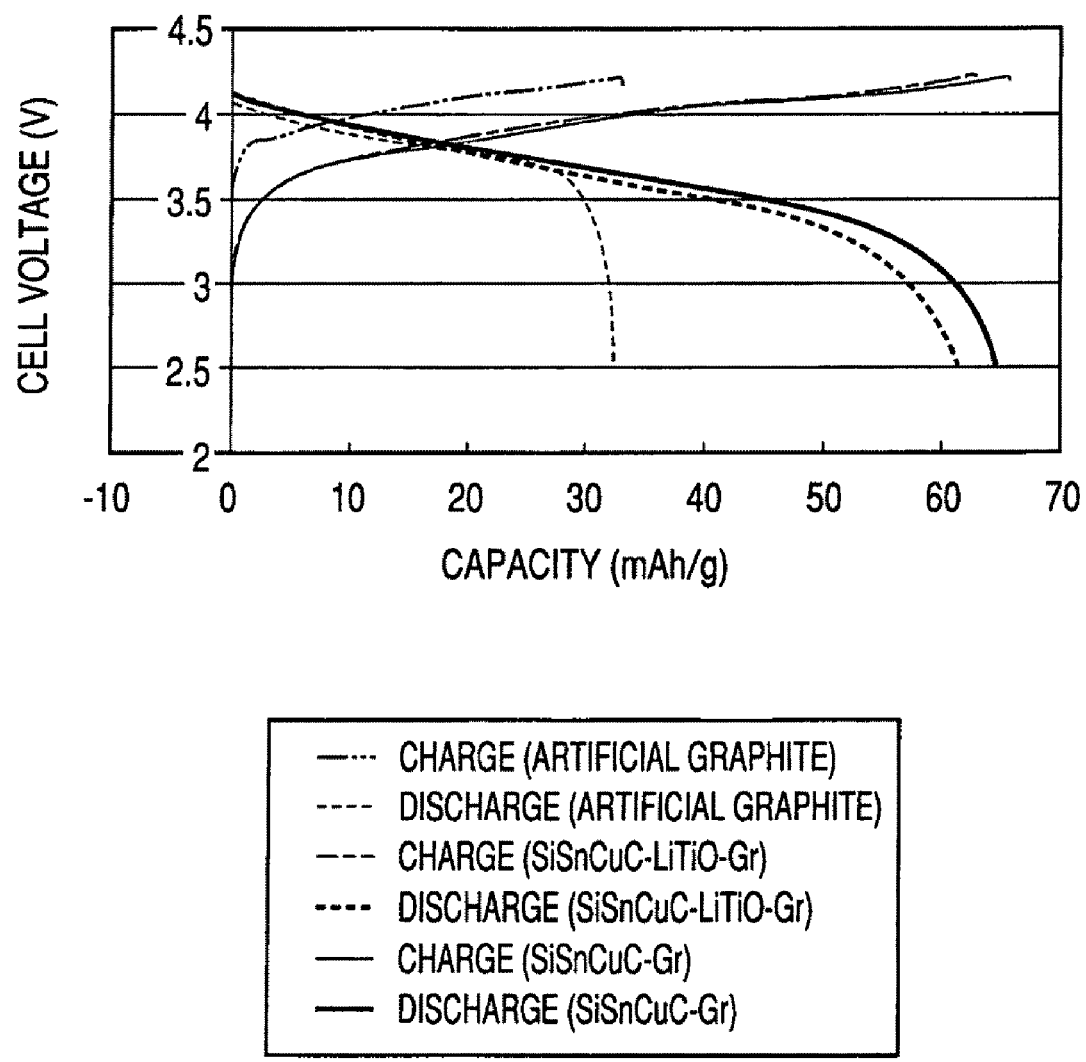
FIG. 7 illustrates charge and discharge curves of a energy storage device in combination of a negative electrode including Si—Sn alloy brought into a composite state with metal oxide being an example of the present invention, Si—Sn alloy and artificial graphite and a positive electrode including lithium manganate.

FIG. 7 illustrates cell voltage to capacity per weight of both of the electrode layers at the time of the fifth cycle of charge and discharge. In the figure, the Comparative Example D2 is indicated as Artificial Graphite, the Reference Example D1 is indicated as SiSnCuC-Gr and the Example D1 is indicated as SiSnCuC-LiTiO-Gr. From FIG. 7, the energy storage device in the Example D1 apparently provides larger charge and discharge capacity than the energy storage device in the Comparative Example D2 does. The energy storage device in the Example D1 is slightly smaller than the Reference Example D1 in charge and discharge capacity. However, in consideration that Li$_4$Ti$_5$O$_{12}$ in the amount of 20% by weight having little capacity in charge and discharge is included in the active material of the negative electrode of the energy storage device in the Example D1, optimization of the amount of Li$_4$Ti$_5$O$_{12}$ to be brought into a composite state within a range less than 20% by weight enables fabrication of a device superior to the energy storage device in the Reference Example D1 in charge and discharge capacity.

[Method of Testing and Evaluating Power Density and Energy Density]

The respective energy storage devices in the above described Comparative Example D1, Comparative Example D2, Reference Example D1 and Example D1 were charged at a constant current and constant voltage and then discharged at a predetermined power until the cell voltage reached a predetermined value to measure the successively discharged energy. Here, the energy storage device in the Comparative Example D1 was charged with constant current density of 2.4 mA/cm$^2$ until the cell voltage reached 2.7 V and further charged at a constant voltage of 2.7 V and then allowed to pause for 5 minutes and discharged with a constant power until the cell voltage reached 1.3 V. The energy storage devices in the Comparative Example D2, the Reference Example D1 and the Example D1 were charged with constant current density of 1.6 mA/cm$^2$ until the cell voltage reached 4.2 V and, thereafter, further charged at a constant voltage of 4.2 V and then allowed to pause for 5 minutes and discharged with a constant power until the cell voltage reached 2.7 V.

FIG. 8A is a diagram, that is, so-called Ragon Plots, where power density (W/L), power per volume calculated from the obtained measurement results on each of the energy storage devices is illustrated for energy density (Wh/L), discharge energy per volume for each energy storage device in the Comparative Example D1 (specified as AC/AC), the Comparative Example D2 (specified as Artificial Graphite/LiMn2O4), the Reference Example D1 (specified as SiSnCuC-Gr/LiMn2O4 and the Example D1 (specified as SiSnCuC-LiTiO-Gr/LiMn2O4. Here, the volume on the negative electrode, the separator and the positive electrode is included in the above described calculation. However, the volume of the battery case is not included there.

FIG. 8B is a diagram, that is, so-called Ragon Plots, where specific power (W/kg), power per weight calculated from the obtained measurement results on each of the energy storage devices is illustrated for specific energy (Wh/kg), discharge energy per weight for each energy storage device in the Comparative Example D1, the Reference Example D1 and the Example D1. The weight on the negative electrode, the separator and the positive electrode is included in the above described calculation. However, the weight of the electrolyte solution and the battery case is not included there.

Based on the results in FIG. 8A, the energy storage device in the Example D1 with an electrode of the present invention used as the negative electrode was apparently superior to the energy storage device in the Comparative Example D1 with the activated carbon electrode and the energy storage device in the Comparative Example D2 in energy density and power density.

Based on in FIG. 8B, the energy storage device in the Example D1 was apparently superior to the energy storage device in the Comparative Example D2 in specific energy and got closer to the energy storage device in the Comparative Example D1 in specific power. Here, the energy storage device in the Comparative Example D1 is an electric double layer capacitor with an activated carbon electrode. The energy storage device in the Comparative Example D2 is a conventional lithium ion secondary battery.

In addition, apparently the Reference Example D1 and the Example D1 were approximately the same in energy density and power density. However, the SiSnCuC alloy used for the negative electrode in the Example D1 is only 80% by weight of that in the Reference Example D1. Therefore, optimization of the amount of Li$_4$Ti$_5$O$_{12}$ to be brought into a composite state to less than 20% by weight is deemed to enable fabrication of an energy storage device superior to the energy storage device in the Reference Example D1 in energy density and power density.

Moreover, the energy storage device in combination of a negative electrode including particles containing one of silicon, tin and alloy including at least one thereof brought into a composite state with one of metal oxide and metalloid oxide of the present invention and a positive electrode with optimized capacity including transition metal compound of transition metal lithium oxide and the like brought into a composite state with metal oxide will have larger energy density and power density than a conventional energy storage device does.

In addition, by appropriately bringing one of material with high specific surface area such as activated carbon and high conductive material such as graphite into a composite state further with one of the negative electrode and the positive electrode of the energy storage device of the present invention, designing of an energy storage device providing desired power and having desired energy will become feasible.

As described above, according to the present invention, an energy storage device with high power density, high energy density and repetition lifetime can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-161526, filed Jun. 9, 2006, which is hereby incorporated by reference herein in its entirety.

What is claimed is:

1. A powder material which allows lithium ions to be stored therein and released therefrom electrochemically, comprising:
   a composite comprising particles of silicon or an alloy containing silicon; and
   one of a metal oxide and a semi-metal oxide,
   wherein a Gibbs free energy when one of a metal and a semi-metal constituting the one of the metal oxide and the semi-metal oxide is oxidized is smaller than a Gibbs free energy when the one of silicon and the alloy containing silicon contained in the particles is oxidized,
   wherein a weight ratio of the one of the metal oxide and the semi-metal oxide to the particles in the composite is within a range of 1/99 to 3/7,
   wherein the powder material is formed of secondary particles, each comprising an aggregation of primary particles of silicon metal or an alloy thereof bound by metal oxide particles or semi-metal oxide particles coated on the entire surface of the primary particles, and the metal oxide particles or the semi-metal particles are disposed at an interface between the primary particles,
   wherein the primary particles are microcrystalline having an amorphous phase or are amorphous, and
   wherein an average particle diameter of the particles of silicon metal or an alloy thereof is within the range of 0.5 µm to 5 µm, an average particle diameter of the metal oxide or semi-metal oxide particle is within the range of 5 nm to 500 nm, and a crystalline size of the silicon metal or the alloy thereof is 100 nm or less.

2. The powder material according to claim 1, wherein the one of the metal oxide and the semi-metal oxide is at least one oxide selected from metal oxides and composite oxides containing an element selected from the group consisting of Mo, W, Nb, Ta, V, B, Ti, Ce, Al, Ba, Zr, Sr, Th, Mg, Be, La, Ca, and Y as a main component.

3. The powder material according to claim 1, wherein the one of the metal oxide and the semi-metal oxide is an oxide which exists thermodynamically more stably than silicon oxide and is selected from metal oxide and composite oxides of such a metal as to have a Gibbs free energy of an oxidation reaction thereof which is a larger negative value than a Gibbs free energy of an oxidation reaction of silicon.

4. The powder material according to claim 3, wherein the one of the metal oxide and the semi-metal oxide is at least one oxide selected from oxides and composite oxides containing an element selected from the group consisting of B, Ti, Ce, Al, Ba, Zr, Sr, Th, Mg, Be, La, Ca, and Y as a main component.

5. The powder material according to claim 1, wherein the one of the metal oxide and the semi-metal oxide is selected from the group consisting of $WO_2$, $TiO_2$, $MoO_2$, $Nb_2O_5$, $MoO_3$, $WO_3$, $Li_4Ti_5O_{12}$, $Li_2Nb_2O_5$, $LiNbO_3$, $LiWO_2$, $LiMoO_2$, $LiTi_2O_4$, $Li_2Ti_2O_4$, $H_2Ti_{12}O_{25}$, $Na_2Ti_{12}O_{25}$, $VO_2$, $V_6O_{13}$, $Al_2O_3$, $Al_2O_3 \cdot Na_2O$, $MgO$, $ZrO_2$, and $La_2O_3$; those oxides having the same constituent elements as the compounds set forth above but nonstoichiometric ratios of metal or semi-metal element to oxygen element; and those oxides having the same elemental compositions as the compounds set forth above but having a part of one element of W, Ti, Mo, Nb, V, Al, Mg, Zr and La thereof replaced by another metal or semi-metal element and contains one element of W, Ti, Mo, Nb, V, Al, Mg, Zr, and La as a main component.

6. The powder material according to claim 5, wherein the one of the metal oxide and the semi-metal oxide is selected from the group consisting of $Al_2O_3$, $MgO$, $ZrO_2$, and $La_2O_3$; those oxides having the same constituent elements as the compounds set forth above but nonstoichiometric ratios of transition metal element to oxygen element; and those oxides having the same elemental compositions as the compounds set forth above but having a part of one element of Al, Mg, Zr, and La thereof replaced by another metal or semi-metal element.

7. The powder material according to claim 1, wherein the weight ratio of the one of the metal oxide and the semi-metal oxide to the particles in the composite is within a range of 1/49 to 1/4.

8. The powder material according to claim 1, wherein the alloy containing silicon is an alloy selected from an alloy of silicon and a transition metal, and an alloy of silicon, tin, and a transition metal.

9. The powder material according to claim 8, wherein the alloy containing silicon is amorphous or microcrystalline.

10. The powder material according to claim 1, wherein the composite comprises carbon, and a weight ratio of the carbon element to particles of one of silicon and an alloy of silicon is within a range of 0.05 to 1.0.

11. An electrode structure comprising a current collector and an electrode material layer formed of an active material comprising the powder material set forth in claim 1.

12. The electrode structure according to claim 11, wherein the electrode material layer comprises the active material and a binder.

13. The electrode structure according to claim 12, wherein the electrode material layer comprises the active material, a conductive auxiliary material, and a binder.

14. The electrode structure according to claim 11, wherein the electrode material layer has a density within a range of 0.5 $g/cm^3$ to 3.0 $g/cm^3$.

15. An energy storage device which comprises a negative electrode using the electrode structure set forth in claim 11, a lithium ion conductor, and a positive electrode comprising a positive electrode active material layer, and a current collector, and which utilizes an oxidation reaction of lithium and a reduction reaction of lithium ion.

16. The energy storage device according to claim 15, wherein the positive electrode active material comprises a transition metal compound selected from a transition metal oxide, a transition metal phosphate compound, a lithium transition metal oxide, and a lithium transition metal phosphate compound, has an amorphous phase, and forms a composite with an oxide or composite oxide containing an element selected from the group consisting of Mo, W, Nb, Ta, V, B, Ti, Ce, Al, Ba, Zr, Sr, Th, Mg, Be, La, Ca, and Y as main a component, and wherein a content of the oxide or composite oxide is 1 to 20% by weight of the composite including the positive electrode active material, and a contribution rate of the oxide or composite oxide with respect to an amount of charged/discharged electricity is 20% or less.

17. The energy storage device according to claim 15, wherein the positive electrode active material comprises a carbon material having a specific surface area within a range of 10 to 3000 $m^2/g$.

18. The energy storage device according to claim 17, wherein the carbon material is selected from the group consisting of active carbon, mesoporous carbon, carbon fiber, and carbon nanotube.

19. The energy storage device according to claim 16, wherein the transition metal compound contains a crystallite of a size of 100 nm or less.

20. The powder material according to claim 1, wherein the crystallite size of the silicon metal, or the alloy thereof is 20 nm or less.

* * * * *